(12) United States Patent
Martin

(10) Patent No.: US 10,684,626 B1
(45) Date of Patent: Jun. 16, 2020

(54) HANDLING INTERSECTION NAVIGATION WITHOUT TRAFFIC LIGHTS USING COMPUTER VISION

(71) Applicant: Ambarella International LP, Santa Clara, CA (US)

(72) Inventor: Patrick Martin, Rochester, MI (US)

(73) Assignee: Ambarella International LP, Santa Clara, CA (US)

( * ) Notice: Subject to any disclaimer, the term of this patent is extended or adjusted under 35 U.S.C. 154(b) by 57 days.

(21) Appl. No.: 16/185,311

(22) Filed: Nov. 9, 2018

Related U.S. Application Data

(63) Continuation-in-part of application No. 15/965,891, filed on Apr. 28, 2018, and a continuation-in-part of application No. 16/001,242, filed on Jun. 6, 2018, and a continuation-in-part of application No. 16/033,724, filed on Jul. 12, 2018, and a continuation-in-part of application No. 16/118,787, filed on Aug. 31, 2018, and a continuation-in-part of application No. 16/132,677, filed on Sep. 17, 2018.

(60) Provisional application No. 62/653,008, filed on Apr. 5, 2018.

(51) Int. Cl.
*G05D 1/02* (2020.01)
*G05B 13/02* (2006.01)
*G05D 1/00* (2006.01)

(52) U.S. Cl.
CPC ......... *G05D 1/0253* (2013.01); *G05B 13/027* (2013.01); *G05D 1/0088* (2013.01)

(58) Field of Classification Search
CPC ... G05D 1/0253; G05D 1/0088; G05B 13/027
USPC .......................................................... 701/27
See application file for complete search history.

(56) References Cited

U.S. PATENT DOCUMENTS

| 9,336,436 | B1* | 5/2016 | Dowdall | G06K 9/00496 |
| 2017/0232964 | A1* | 8/2017 | Moritani | B60W 30/09 |
| | | | | 701/70 |
| 2018/0157972 | A1* | 6/2018 | Hu | G06N 3/08 |
| 2019/0176844 | A1* | 6/2019 | Sedlmayr | B60W 50/14 |

OTHER PUBLICATIONS

Ren, Shaoqing, et al., "Faster R-CNN: Towards Real-Time Object Detection With Region Proposal Networks", arXiv preprint arXiv:1506.01497v3 [cs.CV], Jan. 6, 2016, 14 pages.
Girshick, Ross, "Fast R-CNN", arXiv: 150408083v2 [cs.CV], Sep. 27, 2015, 9 pages.
(Continued)

*Primary Examiner* — Muhammad Shafi
(74) *Attorney, Agent, or Firm* — Christopher P. Maiorana, PC

(57) ABSTRACT

An apparatus includes a capture device and a processor. The capture device may be configured to generate a plurality of video frames corresponding to an area outside of a vehicle. The processor may be configured to perform operations to detect objects in the video frames, detect an intersection and other vehicles at the intersection based on the objects detected in the video frames, determine a vehicle sequence for traversing the intersection and monitor the other vehicles traversing the intersection using the operations. The vehicle sequence may be determined in response to local rules. The vehicle sequence may be used to determine when the vehicle traverses the intersection.

18 Claims, 12 Drawing Sheets

(56) References Cited

OTHER PUBLICATIONS

Dai, Jifeng et al., "Instance-Aware Semantic Segmentation Via Multi-Task Network Cascades", IEEE Conference on Computer Vision and Pattern Recognition (CVPR), 2016, pp. 3150-3158.
Ujjwalkarn, "An intuitive Explanation of Convolutional Neural Networks", https://ujjwalkarn.me/2016/08/11/intuitive-explanation-convnets/, The Data Science Blog, Aug. 11, 2016, 16 pages.
Daniel Smilkov et al., "A Neural Network Playground", http://playground.tensorflow.org, Mar. 10, 2016, 2 pages.

* cited by examiner

HANDLING INTERSECTION NAVIGATION WITHOUT TRAFFIC LIGHTS USING COMPUTER VISION This application relates to U.S. Ser. No. 15/965,891, filed Apr. 28, 2018, which relates to U.S. Provisional Application No. 62/653,008, filed Apr. 5, 2018. This application also relates to U.S. Ser. No. 16/001,242, filed Jun. 6, 2018, U.S. Ser. No. 16/033,724, filed Jul. 12, 2018, U.S. Ser. No. 16/118,787, filed Aug. 31, 2018 and U.S. Ser. No. 16/132,677, filed Sep. 17, 2018. Each of the mentioned applications are hereby incorporated by reference in its entirety.

FIELD OF THE INVENTION

The invention relates to computer vision generally and, more particularly, to a method and/or apparatus for implementing handling intersection navigation without traffic lights using computer vision.

BACKGROUND

Autonomous and semi-autonomous vehicles can improve road safety. For autonomous and semi-autonomous driving, human driver decisions will need to be translated to autonomous driving rules. As autonomous driving becomes more widespread, autonomous vehicles will still share the road with conventional vehicles driven by humans. Many roadway scenarios have rules and regulations and conventions. Human drivers rely on the rules and regulations and the conventions to successfully navigate roadway scenarios. Some conventions also include concepts such as courtesy (i.e., allowing another driver to merge ahead, allowing someone who does not technically have the right of way to go first, etc.) that do not technically follow roadway rules. Even so, human drivers expect other vehicles to follow conventions.

One common driving scenario that needs to be handled for autonomous driving is intersections that do not have traffic lights. Intersections have numerous rules and human drivers tend to not strictly follow the rules. Some drivers will be polite and wave another through the intersection, or flash high beams to indicate to another driver to go first. For human drivers, to safely navigate an intersection one approach is to make eye contact with the other driver and watch for any gestures. Since autonomous vehicles will share the road with human drivers, an autonomous vehicle will need to follow rules and regulations as well as understand conventions when navigating intersections.

It would be desirable to implement handling intersection navigation without traffic lights using computer vision.

SUMMARY

The invention concerns an apparatus comprising a capture device and a processor. The capture device may be configured to generate a plurality of video frames corresponding to an area outside of a vehicle. The processor may be configured to perform operations to detect objects in the video frames, detect an intersection and other vehicles at the intersection based on the objects detected in the video frames, determine a vehicle sequence for traversing the intersection and monitor the other vehicles traversing the intersection using the operations. The vehicle sequence may be determined in response to local rules. The vehicle sequence may be used to determine when the vehicle traverses the intersection.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing handling intersection navigation without traffic lights that may (i) utilize interior and/or exterior cameras of a vehicle, (ii) determine a sequence of vehicles for navigating an intersection, (iii) combine knowledge of local roadway rules and convention, (iv) detect indications to traverse an intersection outside of a technical sequence, (v) promote and/or demote a vehicle in a sequence based on computer vision, (vi) implement fleet learning to train a convolutional neural network, (vii) utilize computer vision with sensor fusion and/or (viii) be implemented as one or more integrated circuits.

Embodiments of the present invention may utilize interior and/or exterior cameras and communication systems of vehicles (e.g., 3G, 4G, LTE, 5G, etc.). The present invention may implement computer vision to determine information about the interior and/or exterior of a vehicle. Using computer vision, embodiments of the present invention may classify and/or determine characteristics of objects in a vehicle (e.g., occupants, seats, steering wheels, handheld devices, seatbelts, etc.) and/or outside of a vehicle (e.g., roadway patterns, street signs, vehicles, pedestrians, animals, etc.). The computer vision analysis may be used to navigate roadways. In an example, body characteristics and/or gestures of an occupant of another vehicle may be analyzed to determine how to react. In another example, roadway patterns, such as an intersection, may be detected to determine which rules to apply for navigation. Once the roadway pattern is detected, video analysis of the location may be performed to detect objects at the intersection (e.g., stop signs, yield signs, road/lane markings, other vehicles, pedestrians, etc.). By using computer vision to determine and/or understand the characteristics of the intersection and/or the objects at the intersection, a sequence of vehicles may be generated to determine in which order the vehicles should navigate the intersection. In some embodiments, vehicle to infrastructure (V2I) and/or vehicle to vehicle (V2V) (together, V2X) communication may be implemented to provide each vehicle with the sequence. Further computer vision analysis may be performed to over-ride the sequence determined (e.g., to allow emergency vehicles, to account for other drivers waving a car through out of order, a vehicle not stopping, etc.).

Figure 1:
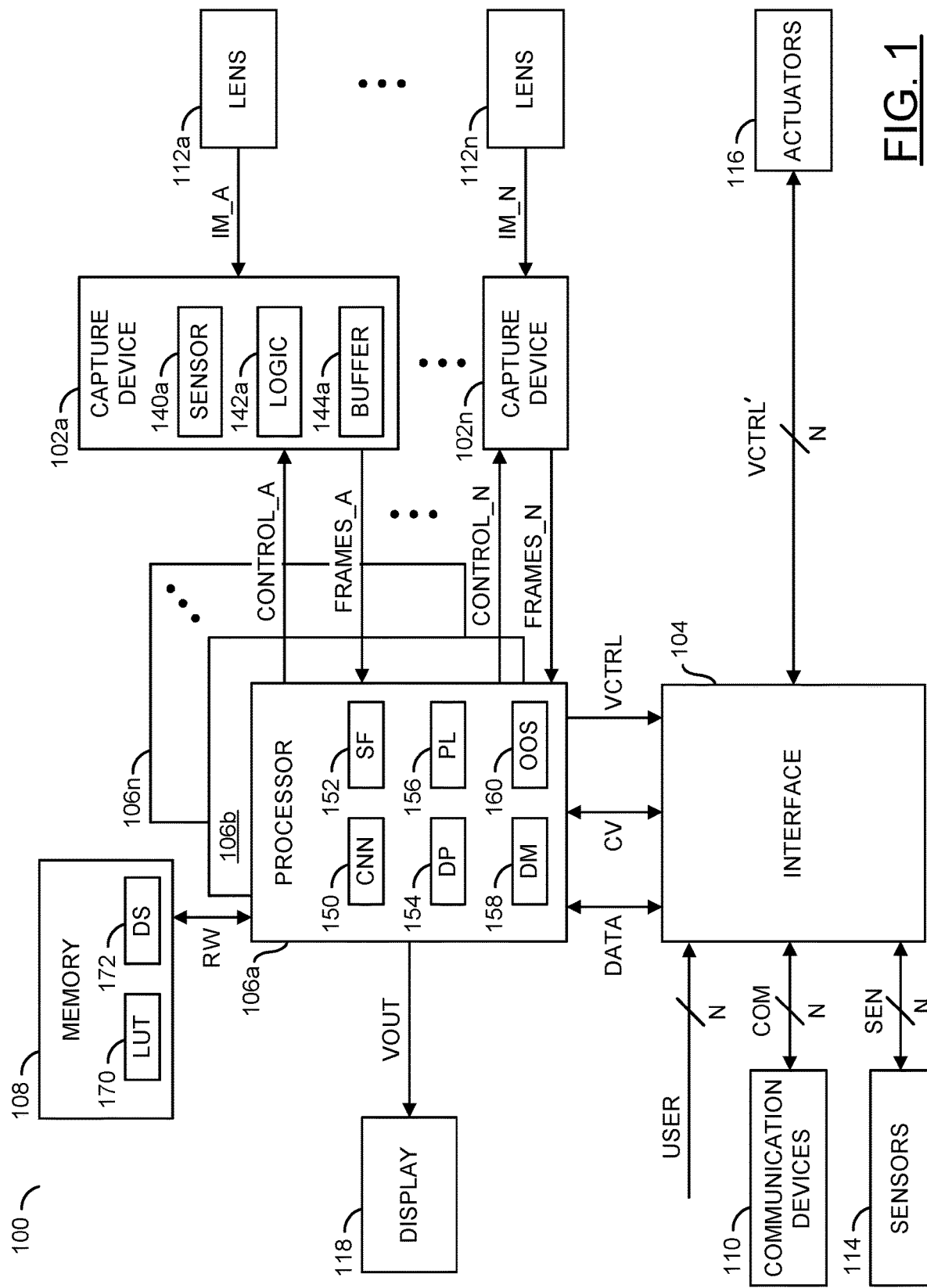
FIG. 1 is a diagram illustrating an embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or a block (or circuit) 118. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuit 118 may implement a display. The apparatus 100 may comprise other components (not shown). The number, type and/or arrangement of the components of the apparatus 100 may be varied according to the design criteria of a particular implementation.

In various embodiments of the apparatus 100, the components 102a-118 may be implemented as a distributed camera system 100. In the distributed system embodiment of the apparatus 100, each component may be implemented separately throughout an installation location (e.g., such as a vehicle). In some embodiments of the apparatus 100, the components 102a-118 may be implemented on a printed circuit board (e.g., a single module). In the single module embodiment, each component may be connected to a single module (e.g., such as a circuit board on a small device such as a drone). In some embodiments, some of the components 102a-118 may be implemented on a single module and some of the components 102a-118 may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle).

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118 may be implemented as part of another one of the components 102a-118. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., the display 118).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, a signal (e.g., VOUT) and/or send/receive the signal DATA, the signal CV and/or a signal (e.g., RW). The signal VOUT may provide a video data output to the display 118. The signal RW may communicate data to/from the memory 108. The signal VOUT, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170 and/or a block (or circuit) 172. The block 170 may implement a look up table. The block 172 may implement data storage. The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The display 118 may be a screen and/or an output device. In one example, the display 118 may implement an electronic mirror (e.g., an e-mirror). In another example, the display 118 may implement a touchscreen for an infotainment system. In yet another example, the display 118 may implement a back-up camera and/or bird's eye view camera. The display 118 may display a version of video frames captured by one or more of the lenses 112a-112n and/or the capture devices 102a-102n. The video frames captured by the capture device 102a-102n may be cropped, adjusted and/or encoded by the processors 106a-106n to fit the display 118. For example, the processor 106a-106n may provide real-time video streaming to the display 118 via the signal VOUT.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision implemented by the CNN module 150 may be described in association with FIG. 5.

The sensor fusion module 152 may be configured to analyze information from multiple sensors 114 and/or capture devices 102a-102n for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.) and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection and/or high dynamic range processing. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the display 118 (e.g., the signal VOUT).

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of the display 118 by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the display 118. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signal VOUT may be an encoded, cropped, stitched and/or enhanced version of one or more of the signals FRAMES_A-FRAMES_N. The signal VOUT may be a high resolution, digital, encoded, de-warped, stabilized, cropped, blended, stitched and/or rolling shutter effect corrected version of the signals FRAMES_A-FRAMES_N.

Figure 2:
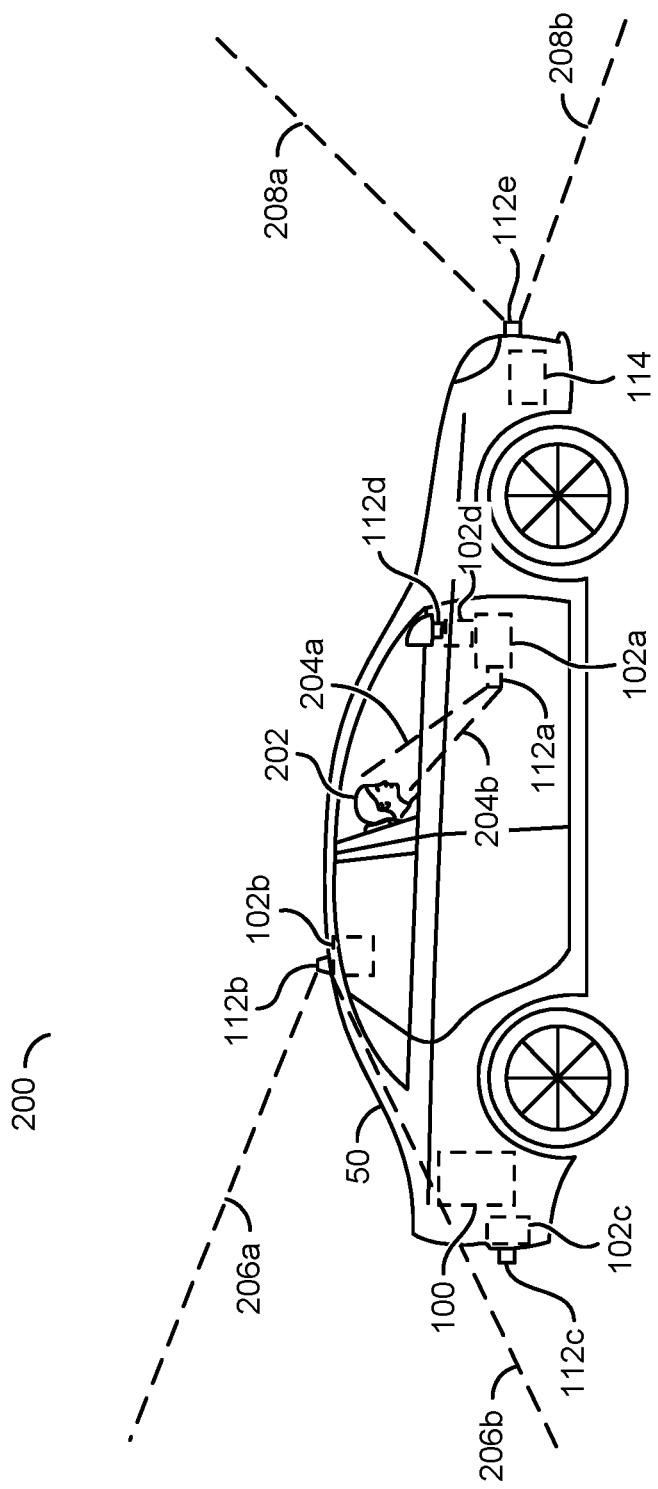
FIG. 2 is a diagram illustrating an example of camera systems inside and outside of a vehicle.

Referring to FIG. 2, an example embodiment 200 of camera systems inside and outside of a vehicle is shown. An automobile/vehicle 50 is shown. The apparatus 100 is shown as a component of the vehicle 50. In the example shown, the vehicle 50 is a car. In some embodiments, the vehicle 50 may be a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be implemented to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
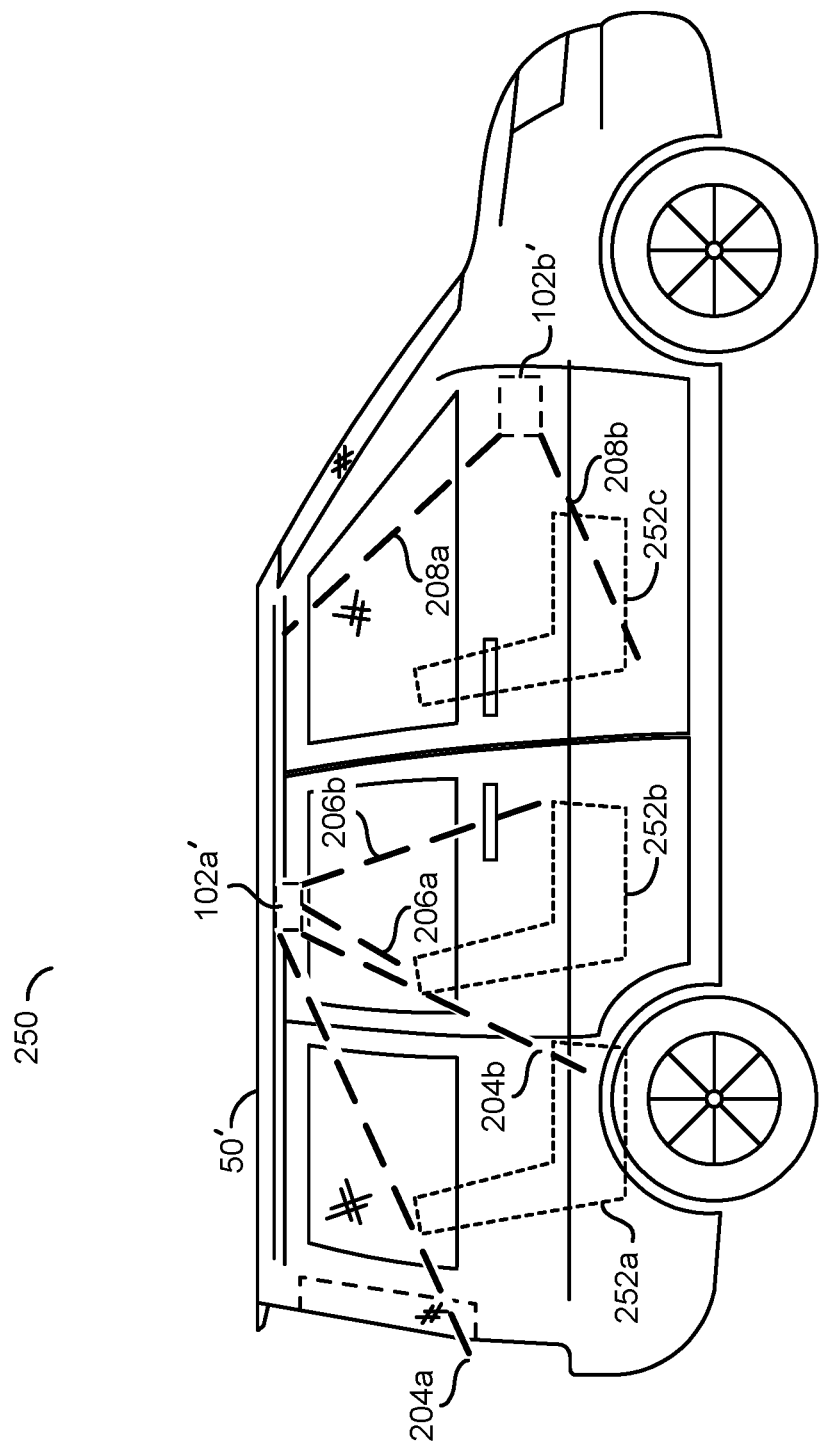
FIG. 3 is a diagram illustrating an example of interior camera systems configured to monitor vehicle occupants.

Referring to FIG. 3, a diagram illustrating an example 250 of interior camera systems configured to monitor vehicle occupants is shown. Various camera angles of an interior of the vehicle 50' are shown. Multiple rows of seats 252a-252c are shown in the vehicle 50'. Each of the rows of seats 252a-252c may be monitored to detect and/or classify one or more occupants of the vehicle 50'.

The capture device 102a' is shown mounted on a ceiling of the vehicle 50'. The capture device 102a' is shown having an angle 204a and an angle 204b (e.g., a field of view) that points toward the back row of seats 252a. The capture device 102a' may also have a field of view angle 206a-206b to capture the middle row of seats 252b. In another example, the capture device 102a' may implement a wide angle lens to capture both rows of seats. The field of view from the angle 204a and the angle 204b may provide a targeted view of the interior of the vehicle 50'. Similarly, the capture device 102b' may capture an interior of the vehicle 50'. An angle 208a and an angle 208b may represent a field of view capturing the front row of seats 252c. The multiple fields of view captured by the capture devices 102a'-102n' may be a targeted wide angle view of the interior of the vehicle 50'. The number of angles and/or fields of view may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver, other occupants, physical characteristics of people in the vehicle, facial expressions of people in the vehicle, fields of view of the people in the vehicle, etc.). The processors 106a-106n may be configured to determine an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person. For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands) and/or determine a vulnerability of an occupant (e.g., a non-moving occupant may be asleep and/or unconscious).

In some embodiments, the processors 106a-106n may implement depth-sensing techniques. The depth-sensing techniques may compare knowledge of the dimensions of the vehicle 50' to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the vehicle 50' was parked, when the vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the vehicle 50'. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to the display 118 (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

Figure 4:
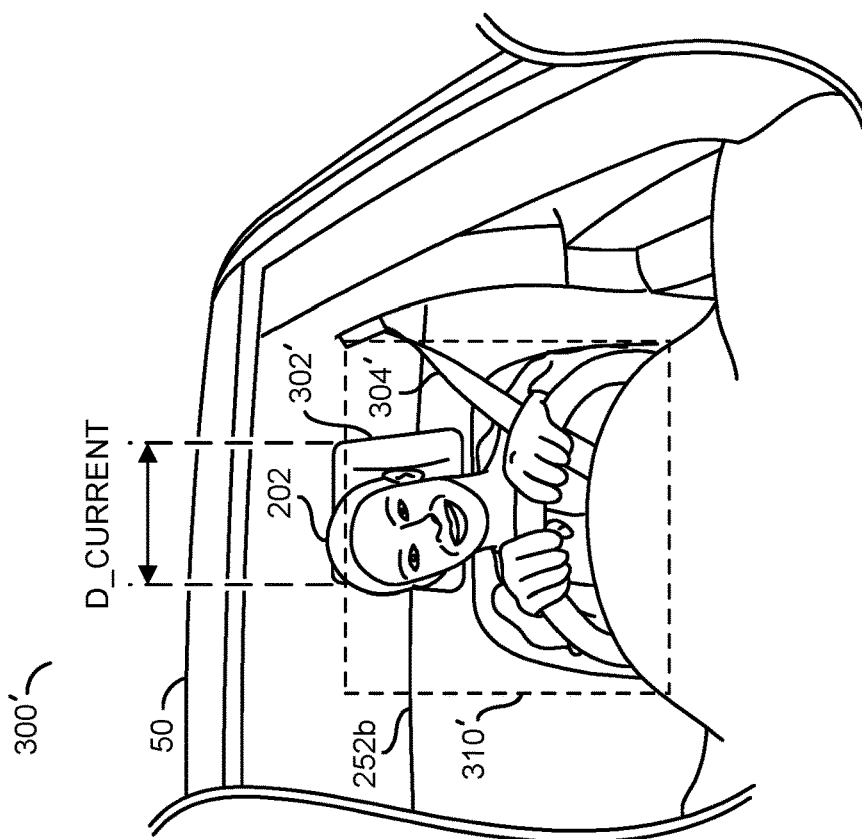
FIG. 4 is a diagram illustrating an object comparison between a reference video frame and a captured video frame.
Figure 4:
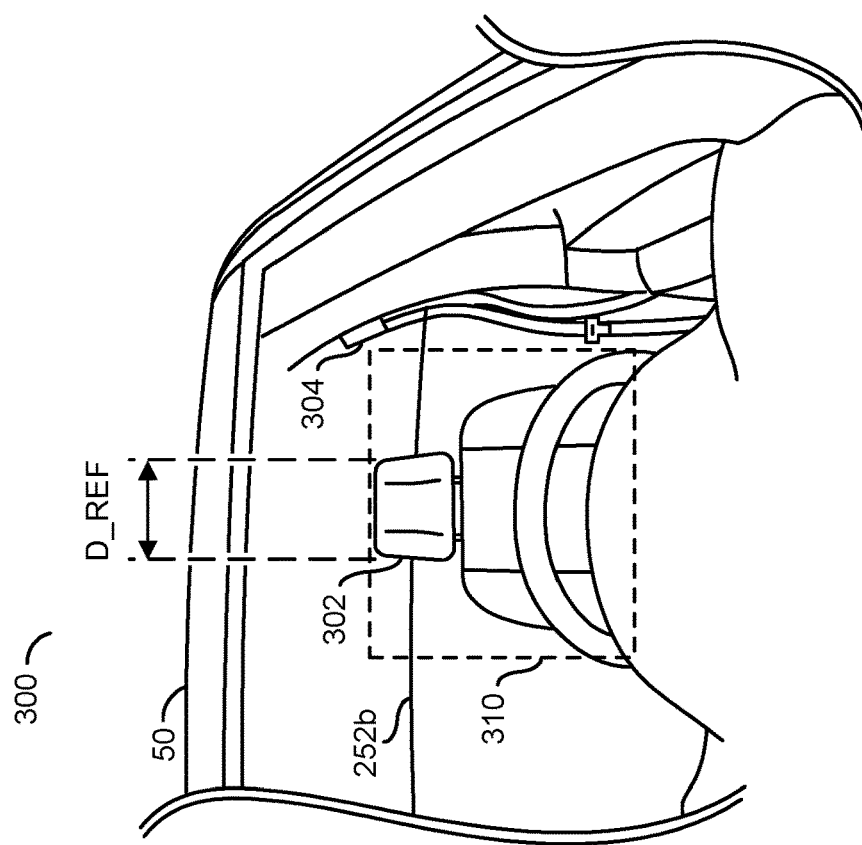

Referring to FIG. 4, a diagram illustrating an object comparison between a reference video frame 300 and a current video frame 300' is shown. The reference video frame 300 and the current video frame 300' may be video frames processed by the processors 106a-106n (e.g., generated in response to the signals FRAMES_A-FRAMES_N by one of the capture devices 102a-102n). The reference video frame 300 and the current video frame 300' may be a targeted view directed towards the interior of the vehicle 50. In an example, the lens 112a mounted on the dashboard of the vehicle 50 may capture the reference video frame 300 and the current video frame 300'. The view captured for each of the video frames may be varied according to the design criteria of a particular implementation.

The reference video frame 300 may be a video frame captured at an earlier time than the current video frame 300'. For example, the reference video frame 300 may be stored in the memory 108 (e.g., in the data storage portion 172). In some embodiments, the reference video frame 300 may be pre-loaded in the apparatus 100. For example, the reference video frame 300 may be captured by implementing fleet learning (e.g., to be described in more detail in association with FIG. 5). In some embodiments, the reference video frame 300 may be captured when the vehicle 50 is idle and/or turned off. In some embodiments, the reference video frame 300 may be captured periodically. The method of capturing the reference video frame (or frames) 300 may be varied according to the design criteria of a particular implementation.

The reference video frame 300 shown may be a representative example of one or more reference video frames implemented by the apparatus 100. In an example, reference video frames 300 may be captured for many different scenarios and/or locations within or outside of the vehicle 50. For example, the reference video frames 300 may be captured for a driver seat, a passenger seat, for each seat of the rows 252a-252c, the interior of the vehicle 50, the exterior of the vehicle 50, etc. Generally, the reference video frame 300 is used by the processors 106a-106n to classify, analyze and/or store reference objects. The reference objects may be used by the processors 106a-106n to compare with objects captured in the current video frame 300'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects may be varied according to the design criteria of a particular implementation.

In the example reference video frame 300, a reference object 302 is shown. In the example shown, the reference object 302 may be a head rest of the driver side seat. The CNN module 150 may determine the width (e.g., D_REF) of the reference object 302 (e.g., based on the number of pixels occupied in the reference video frame 300). In some embodiments, the look up table 170 may store the width D_REF. The width D_REF may be determined when the reference object 302 is at a known distance from the lens 112a.

In the example reference video frame 300, a reference object 304 is shown. In the example shown, the reference object 304 may be a driver seat belt. The CNN module 150 may determine a location of the seat belt 304 (e.g., a location based on a horizontal and/or vertical pixel count). In some embodiments, sensors 114 may provide an indication of the status of the seat belt 304 (e.g., clicked into place, unused, etc.). The sensor fusion module 152 may use the computer vision data from the CNN module 150 and/or the readings of the sensors 114 to determine a confidence level of the status of the seat belt 304. In the example shown, the reference video frame 300 may provide a reference for when the status of the seat belt 304 is unused (e.g., not being worn by a passenger/driver).

In the example reference video frame 300, a reference object 310 is shown. In the example shown, the reference object 310 may be an unoccupied seat. For example, the CNN module 150 may recognize color, shape, distance, stitching, design, etc. of the reference object 310.

The current video frame 300' may be one or more video frames analyzed by the processors 106a-106n (e.g., a video frame within the video pipeline 156). The current video frame 300' may be analyzed by the processors 106a-106n in real-time (e.g., within approximately 500 ms). The CNN module 106a-106n may perform a computer vision analysis on the current video frame 300' and/or compare features and/or characteristics of the current video frame 300' to one or more reference video frames.

The current video frame 300' shows the vehicle 50, the driver 202, the detected object 302', the detected object 304' and/or the detected object 310'. In the current video frame 300', the head rest 302' may be closer to the lens 112a than in the reference video frame 300. In the current video frame 300', the status of the seat belt 304' may be determined to be worn by the driver 202 (e.g., detected across the chest of the driver 202). In the current video frame 300', the detected object 310' may be the driver 202 sitting in the driver seat (e.g., an object covering the details of the empty seat 310 in the reference video frame 300). The processors 106a-106n may detect and/or determine characteristics of various sub-objects of the detected object 310'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 302) may be physically connected to the vehicle 50. In an example, the reference objects may be an arm rest, a steering wheel, the rear seat row 252n, a dashboard, a sunroof and/or a moon roof. The reference object 302 may be a vehicle component that is capable of relative movement with respect to the lens 112a. In some embodiments, the reference object (e.g., the head rest 302) may be used to determine a distance of the driver 202 from the lens 112a (e.g., objects that correlate to where the driver 202 is seated).

For example, if the headrest 302' is determined to be 4.5 feet away (e.g., by comparing the current size D_CURRENT to the reference size D_REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 310', the processors 106a-106n may determine the position (e.g., 3D coordinates and/or location coordinates) of the driver 202 and/or particular body parts of the driver 202.

In some embodiments, the processors 106a-106n may compare the current video frame 300' to the reference video frame 300. In some embodiments, the current video frame 300' may not be directly compared to the reference video frame 300. For example, the CNN module 150 may implement deep learning to gather information and/or statistics about various features of objects. The CNN module 150 may determine features of objects corresponding to the current video frame 300'. The processors 106a-106n may compare the features extracted from the current video frame 300' to features extracted from numerous reference video frames. For example, the reference video frame 300 and/or the current video frame 300' may be used as training data for the CNN module 150. The types of features extracted from video frames to perform the computer vision analysis may be varied according to the design criteria of a particular implementation.

Figure 5:
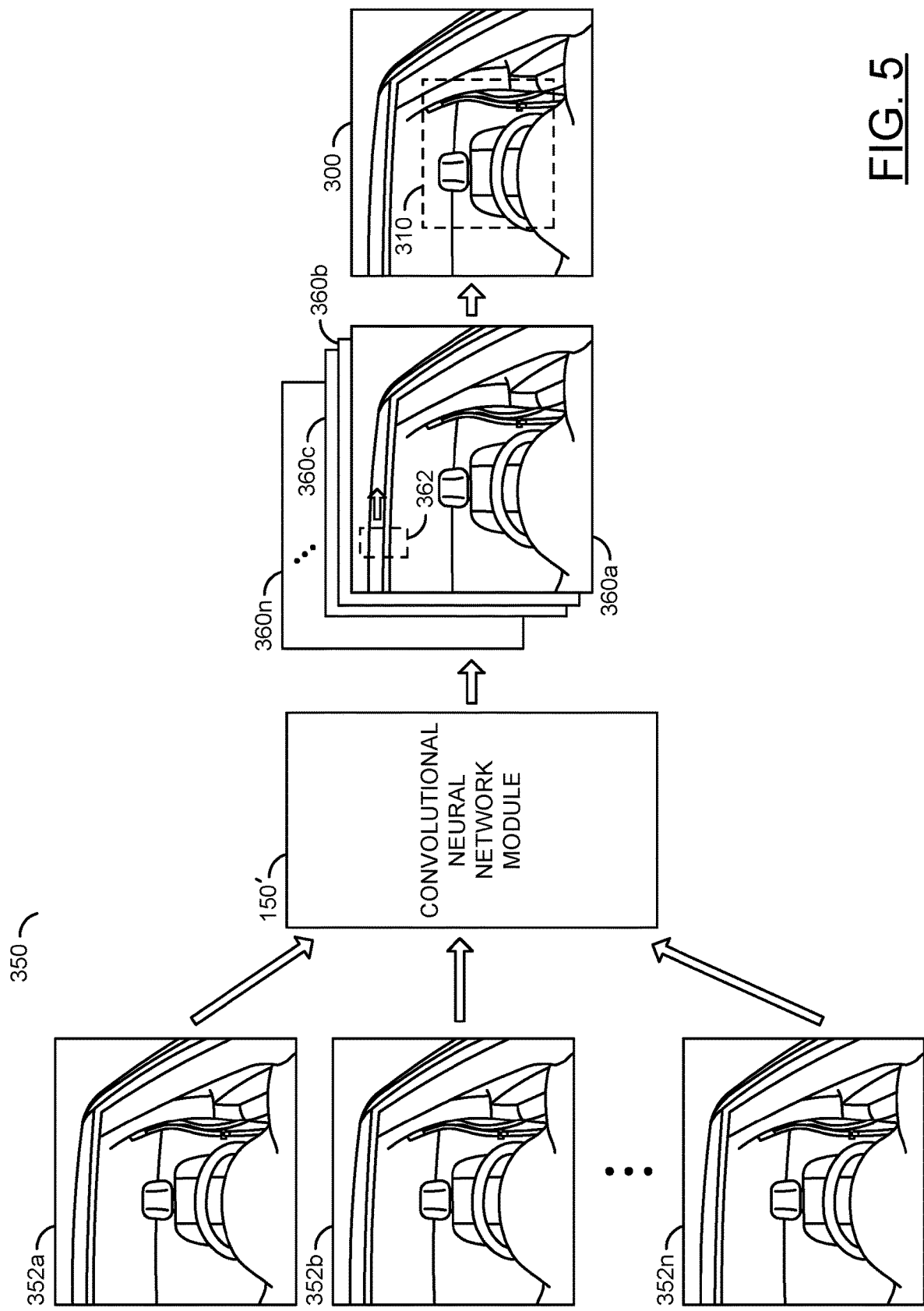
FIG. 5 is a diagram illustrating an example visualization of training a convolutional neural network for object detection using fleet learning.

Referring to FIG. 5, a diagram illustrating an example visualization 350 of training the convolutional neural network 150' for object detection using fleet learning is shown.

To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an unoccupied interior of a vehicle. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360*a*-360*n* to generate a result representing each region. The size of the region, the type of operations applied by the filters and/or the number of layers 360*a*-360*n* may be varied according to the design criteria of a particular implementation.

Using the convolution operations, the CNN module 150' may compute multiple features for pixels of an input image in each extraction step. For example, each of the layers 360*a*-360*n* may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360*a*-360*n* may comprise convolution layers, pooling layers, non-linear layers and/or fully connected layers. In an example, the convolution operations may learn to detect edges from raw pixels (e.g., the first layer 360*a*), then use the feature from the previous layer (e.g., the detected edges) to detect shapes in a next layer (e.g., 360*b*) and then use the shapes to detect higher-level features (e.g., facial features) in higher layers and the last layer may be a classifier that uses the higher level features.

Using the input video frames as the training data 352*a*-352*n*, the CNN module 150' may be trained. The training may comprise determining weight values for each of the layers 360*a*-360*n*. For example, weight values may be determined for each of the layers 360*a*-360*n* for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352*a*-352*n* may be varied according to the design criteria of a particular implementation.

The CNN module 150' may consume input images (e.g., the training data 352*a*-352*n*) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106*a*-106*n*. The color detection process may be used to extract features from the training data 352*a*-352*n*.

The color detection and/or feature extraction process is generally operational to determine a color likelihood value that pixels in each pixel location of an input image (e.g., the training data 352*a*-352*n* during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102*a* and/or the lens 112*a*) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360*a*-360*b*. The feature extraction window 362 may consider a pixel of interest. In an example, the pixel of interest may be a current pixel location being color classified. The feature extraction window 362 may generally represent a local context and contrast around the pixel of interest.

The pixels of the training data 352*a*-352*n* may each be represented as components in multiple color channels. In some designs, the color channels may include a luminance channel (e.g., A) and two chrominance channels (e.g., B and C). In various embodiments, the channels ABC may be representative of YUV, $YC_bC_r$, $YP_bP_r$, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

In the example shown, the training data 352a-352n may show video frames captured of a vehicle interior. In some embodiments, the training data 352a-352n may be video frames capturing a view exterior to the vehicles (e.g., video frames corresponding to an area outside of the ego vehicle 50). For example, the training data 352a-352n may comprise video frames of roadways (e.g., road patterns) and/or objects (e.g., street signs, lane markings, vehicles, pedestrians, etc.). In one example, the CNN module 150' may be trained to detect and/or distinguish various types of roadways (e.g., intersections with traffic lights, intersections without traffic lights, intersections with officers directing traffic, curved roads, straight roads, freeways, expressways, on-ramps, off-ramps, etc.). In another example, the CNN module 150' may be trained to detect and/or distinguish characteristics of other vehicles (e.g., whether a vehicle is moving or stopped, whether a vehicle is flashing high beams, a status of a turn signal, a distance of a vehicle from an intersection, whether the vehicle has emergency lights activated, etc.). In yet another example, the CNN module 150' may be trained to detect and/or distinguish various street signs and/or lane markings (e.g., right turn only lanes, left turn only lanes, stop signs, yield signs, one-way street signs, etc.). In still another example, the CNN module may be configured to detect characteristics of other drivers (e.g., gestures that a driver is making, whether the driver is looking at the road, if the driver is looking at a smartphone, if the driver is distracted, etc.). The types of training data 352a-352n and/or the types of detection that the CNN module 150' may be trained for may be varied according to the design criteria of a particular implementation.

The processors 106a-106n may utilize the CNN module 150 to identify, detect and/or classify drivers and/or pedestrians. The CNN module 150 may implement the computer vision operations to determine the characteristics of the driver and/or pedestrians (e.g., age, body position, movements, etc.).

The CNN module 150 may be updated with data from a central and/or distributed source (e.g., the CNN module 150'). The video analytics and/or computer vision operations performed by the CNN module 150 may process the video frames and/or other video signals for biometric markers to determine the characteristics of the drivers and/or pedestrians. For example, one or more of age, height and/or weight may be biometric markers used to recognize a driver and/or detect movements (e.g., gestures) of a driver. In one example, the biometric markers may be used to recognize a particular driver (e.g., a particular driver may be seen many times at an intersection and the processors 106a-106n may learn that the particular driver usually waves the vehicle 50 through an intersection first). In another example, the biometric markers may be used to identify a sequence of movements as a particular gesture (e.g., a waving motion).

Figure 6:
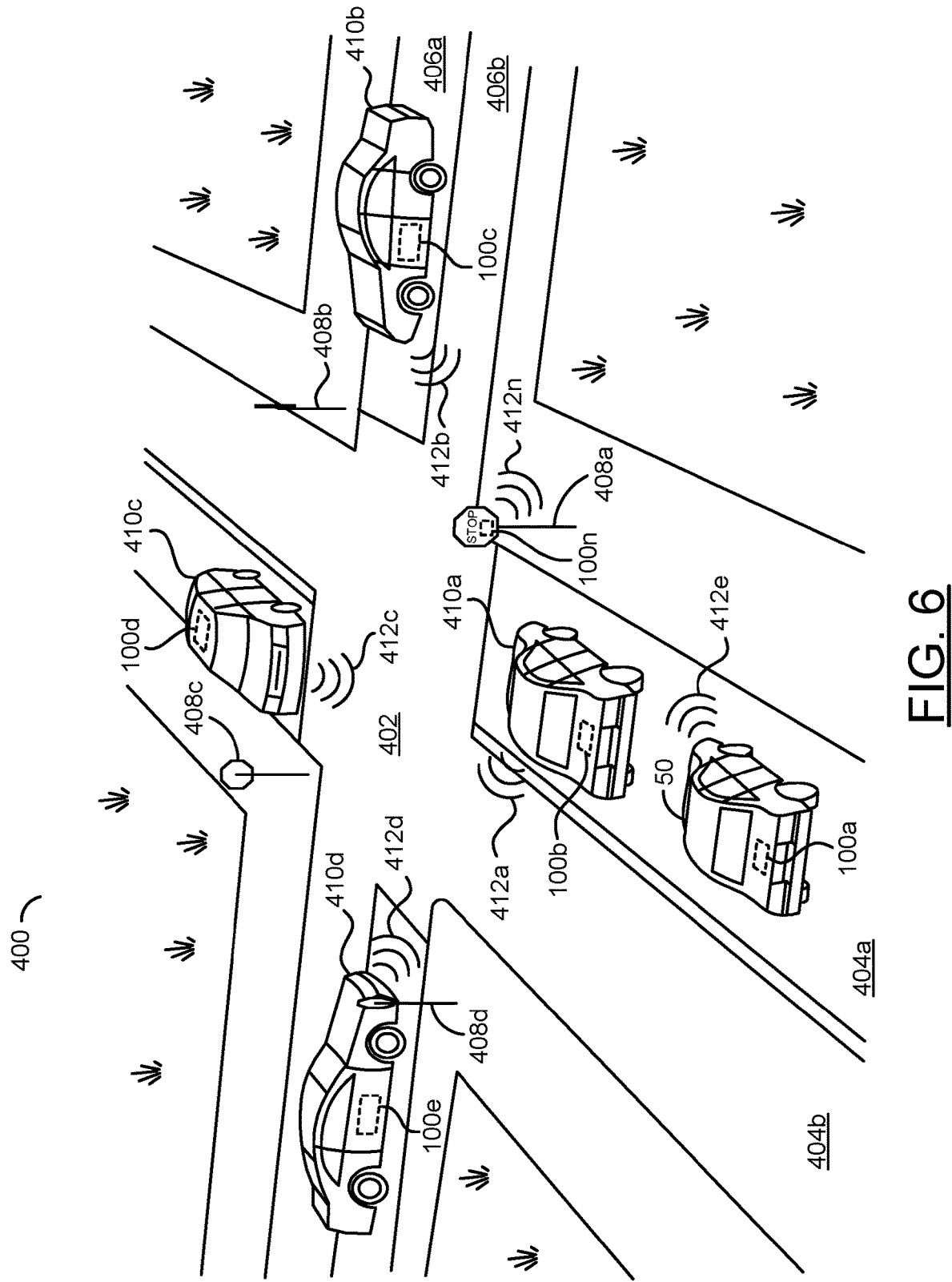
FIG. 6 is a diagram illustrating an example intersection scenario.

Referring to FIG. 6, a diagram illustrating an example intersection scenario 400 is shown. An intersection 402 is shown. The intersection 402 may be a 4-way stop between a road 404a-404b and a road 406a-406b. The road 404a-404b may comprise a lane 404a and a lane 404b (e.g., one lane in each direction). The road 406a-406b may comprise a lane 406a and a lane 406b (e.g., one lane in each direction).

The intersection 402 in the intersection scenario 400 may comprise four stop signs 408a-408d (e.g., a 4-way stop). The stop sign 408a may be a sign for vehicles traveling in the lane 404a. The stop sign 408b may be a sign for vehicles traveling in the lane 406a. The stop sign 408c may be a sign for vehicles traveling in the lane 404b. The stop sign 408d may be a sign for vehicles traveling in the lane 406b.

The intersection scenario 400 may comprise the vehicle 50 (e.g., the ego vehicle), and vehicles 410a-410d. The ego vehicle 50 is shown in the lane 404a approaching the stop sign 408a and may be behind the vehicle 410a. The vehicle 410a is shown in the lane 404a stopped at the stop sign 408a. The vehicle 410b is shown in the lane 406a stopped at the stop sign 408b. The vehicle 410c is shown in the lane 404b stopped at the stop sign 408c. The vehicle 410d is shown in the lane 406b stopped at the stop sign 408d.

Each of the ego vehicle 50 and/or the vehicles 410a-410d may comprise one of the apparatuses 100a-100n. Similarly, infrastructure may implement one or more of the apparatuses 100a-100n. In the example shown, the apparatus 100a may be implemented by the ego vehicle 50, and one of the apparatuses 100b-100e may be implemented by each of the vehicles 410a-410d and the apparatus 100n may be implemented by the stop sign 408a (e.g., the stop sign 408a may be a representative example of infrastructure). In some embodiments one or more of the vehicles 410a-410d may not implement the apparatuses 100a-100n. In some embodiments, the infrastructure may not implement one of the apparatuses 100a-100n. In one example, the only apparatus implemented may be the apparatus 100a in the ego vehicle 50. The arrangement of the apparatuses 100a-100n between vehicles and/or infrastructure may be varied according to the design criteria of a particular implementation.

Each of the apparatuses 100a-100n are shown generating wireless communication 412a-412n. The wireless communication 412a-412n may enable V2X (vehicle-to-vehicle/infrastructure) communication. The V2X communication may enable data to be transferred between the apparatuses 100a-100n (e.g., so each of ego vehicle 50 and the vehicles 410a-410d may access the most up to date information).

The decision module 158 of the processors 106a-106n may be configured to determine a sequence of vehicles for traversing the intersection 402. The sequence of vehicles may be a dynamic ordered list of the ego vehicle 50 and/or the vehicles 410a-410d, other vehicles (e.g., bicycles) and/or pedestrians. The sequence of vehicles may indicate which vehicle(s) should traverse the intersection 402 in which order. For example, as each vehicle traverses the intersection 402, the vehicle may be removed (e.g., popped off) the beginning of the sequence of vehicles. As additional vehicles reach the intersection 402, the additional vehicles may be added to the end the sequence of vehicles. The structure of the sequence of vehicles may be varied according to the design criteria of a particular implementation.

The driving policy block 154 may be used to generate the sequence of vehicles. In some embodiments, the driving policy module 154 may be programmed according to local regulations. The local regulations may be used to determine how the vehicles should be ordered in the sequence of vehicles. The driving policy block 154 may also store local customs to provide additional information for determining the sequence of vehicles.

Generally, the sequence of vehicles may be determined based on the order (e.g., first in, first out) that the ego vehicle 50 and/or the vehicles 410a-410d reach the intersection 402 (e.g., make a complete stop at the intersection 402). In the intersection scenario 400, each of the vehicles 410a-410d are shown stopped at the intersection 402. The ego vehicle 50 may be stopped behind the vehicle 410a. In the example shown, the ego vehicle 50 may be last in the vehicle sequence.

The local rules and/or customs for navigating the intersection 402 (e.g., stored by the driving policy module 154) may indicate that vehicles that stop at the intersection 402 first have the right of way. In one example, the vehicle 410a may stop at the intersection 402 first, the vehicles 410b-410c may stop simultaneously at the intersection 402 next, then the vehicle 410d may stop at the intersection 402 and the ego vehicle 50 may be in queue behind the vehicle 410a. The decision modules 158 of the apparatuses 100a-100n may determine that the vehicle 410a is first in the vehicle sequence. Since the vehicles 410b-410c arrive simultaneously, the local rules stored by the driving policy module 154 may determine which vehicle should be next in the vehicle sequence. In an example, the local rules may indicate that when two vehicles stop simultaneously, the vehicle to the right may have the right of way. Since the vehicle 410c is to the right of the vehicle 410b, the decision modules 158 may determine that the vehicle 410c may be second on the vehicle sequence and then the vehicle 410b may be third. The decision modules 158 of the apparatuses 100a-100n may determine that the vehicle 410d is fourth in the vehicle sequence.

After the vehicle 410a traverses the intersection 402, the order of the other vehicles in the vehicle sequence (e.g., the vehicle 410c, the vehicle 410b and the vehicle 410d) may each be promoted in the vehicle sequence (e.g., the vehicle 410c may be promoted to the first slot in the vehicle sequence). After the vehicle 410a traverses the intersection 402, the ego vehicle 50 may stop at the intersection 402. The ego vehicle 50 may be added to the next available slot in the vehicle sequence (e.g., the bottom of the list in the fourth slot after the vehicle 410c, the vehicle 410b and the vehicle 410d). As the ego vehicle 50 and/or the vehicles 410a-410d traverse the intersection 402, the ego vehicle 50 and/or the vehicles 410a-410d may be removed from (e.g., popped off) the top of the vehicle sequence. As other vehicles arrive at the intersection 402, the other vehicles may be added to the end of the vehicle sequence 402 in order of arrival and/or according to the local rules.

Computer vision operations may be performed by the apparatuses 100a-100n to determine the order that the vehicles arrive at the intersection 402. Computer vision operations may be performed to understand how the local rules apply to the vehicles that arrive at the intersection 402 (e.g., when the vehicles have stopped, the order of arrival, the spatial relation between the vehicles, etc.). The vehicle sequence may be determined based on the computer vision operations performed and/or the rules in the driving policy module 154.

In the example intersection scenario 400, the ego vehicle 50 may arrive at the intersection 402 after the vehicles 410a-410d have already stopped. Since the vehicles 410a-410n may have already stopped before the apparatus 100a can perform the computer vision operations to determine the vehicle sequence, computer vision operations by the apparatus 100a alone may not be capable of determining the vehicle sequence (e.g., if all the vehicles are already stopped before the arrival of the apparatus 100a, the apparatus 100a does not have a chance to analyze the vehicles stopping). The V2X wireless communication 412a-412n may be implemented to communicate the vehicle sequence to each of the ego vehicle 50, the vehicles 410a-410d and/or other vehicles that arrive at the intersection 402.

The V2X communication 412a-412n may enable the ego vehicle 50, the vehicles 410a-410d and/or other vehicles that arrive at the intersection 402 to share a common (e.g., agreed upon) vehicle sequence. The common vehicle sequence may ensure that each of the apparatuses 100a-100n are able to use the same inferences for navigating the intersection 402. In an example, each of the ego vehicle 50, the vehicles 410a-410d and/or other vehicles that arrive at the intersection 402 may request the vehicle sequence from vehicles already at the intersection 402. In another example, the infrastructure (e.g., the stop sign 408a) may implement the apparatus 100n to broadcast the vehicle sequence. For example, since the stop sign 408a may remain at the intersection 402 even after one or more vehicles traverse the intersection 402, the apparatus 100n implemented by the stop sign 408a may provide a master vehicle sequence that is continually updated. Various methods of conflict resolution may be implemented to determine the master vehicle list when many of the apparatuses 100a-100n communicate different versions of the vehicle sequence (e.g., newest version takes precedence, a master list takes precedence, blockchain, etc.). The implementation and/or communication of the vehicle sequence may be varied according to the design criteria of a particular implementation.

In some embodiments, one or more of the vehicles 410a-410d may not implement one of the apparatuses 100a-100n. A vehicle that does not implement one of the apparatuses 100a-100n may still be added to the vehicle sequence. For example, an assumption of the decision module 158 may be that a human-controlled vehicle without one of the apparatuses 100a-100n may follow the local rules. However, the apparatus 100a-100n may be configured to use the computer vision operations to determine whether one or more of the vehicles 410a-410d is not following the local rules and respond accordingly. In one example, the vehicle sequence may be updated in real time to respond to vehicles that may not be following the vehicle sequence (e.g., a vehicle that is not stopping, a vehicle that is traversing the intersection 402 out of sequence, etc.).

Figure 7:
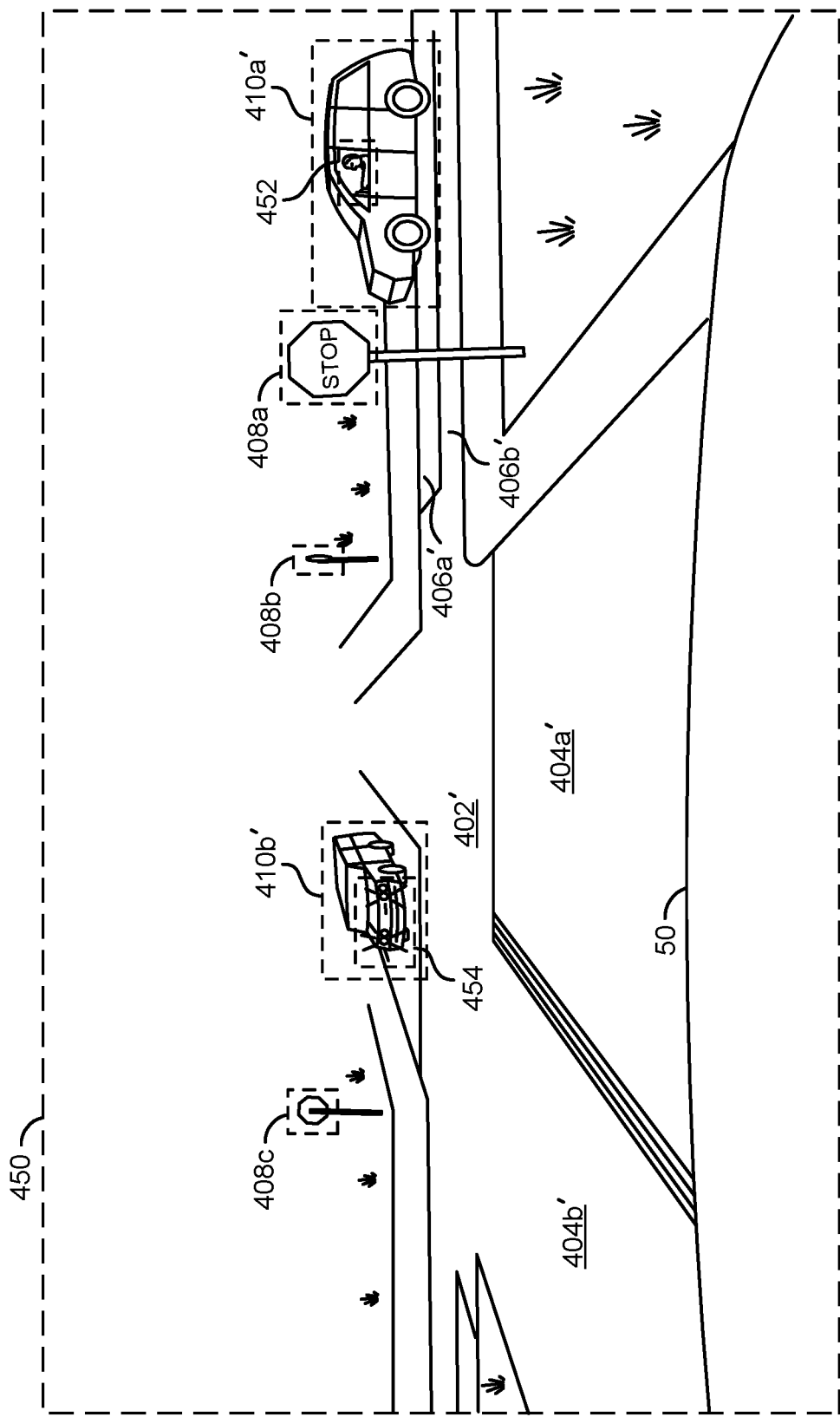
FIG. 7 is a diagram illustrating an example video frame of a vehicle approaching an intersection.

Referring to FIG. 7, a diagram illustrating an example video frame of a vehicle approaching an intersection is shown. An example video frame 450 is shown. The example video frame 450 may be captured by the apparatus 100a implemented in the ego vehicle 50. The example video frame 450 may be captured by one of the capture devices 102a-102n. In the example shown, the example video frame 450 may be captured by one of the capture devices 102a-102n implemented as a dash-mounted camera (e.g., the hood of the ego vehicle 50 is shown at the bottom of the video frame 450).

The example video frame 450 may capture a view of the area outside of the ego vehicle 50 showing the intersection 402'. The ego vehicle 50 is shown in the lane 404a'. The vehicles 410a'-410b' are shown. The vehicle 410a' may be in the perpendicular lane 406a'. The vehicle 410b' may be in the oncoming lane 404b' across the intersection 402'. The stop signs 408a-408c are shown (e.g., the intersection 402' may be a 4-way stop scenario similar to the example shown in association with FIG. 6).

The processors 106a-106n may be configured to perform the computer vision operations on the video frame 450. The CNN module 150 may detect and/or recognize objects and/or characteristics of objects. In the example shown, the CNN module 150 may detect objects such as the vehicle 410a'-410b' and/or the stop signs (e.g., infrastructure) 408a-408c. The CNN module 150 may be configured to detect and/or recognize the pattern (e.g., arrangement, shape, etc.) of the road. For example, the CNN module 150 may detect and/or recognize the lanes 404a'-404b' and/or the lanes 406a'-406b' arranged as the intersection 402'. Furthermore, the CNN module 150 may recognize other objects such as the lane markers, the curb, the sidewalk, the stop line, pedestrians, painted road signs (e.g., turning lane indicators), pedestrian cross-walks, traffic lights, etc. The number and/or types of objects detected, classified and/or recognized by the CNN module 150 may be varied according to the design criteria of a particular implementation.

The apparatus 100 may be configured to distinguish between objects interior to the ego vehicle 50 (e.g., if the capture device 102a is mounted within the ego vehicle 50 and directed outwards) and objects exterior to the vehicle 50. The processors 106a-106n may be configured to determine a distance to the detected objects 408a'-408c' and/or 410a'-410b'. For example, depth-sensing techniques may be implemented to determine a relative distance of the detected objects from the ego vehicle 50.

In the example shown, the computer vision operations may be performed on the single video frame 450. In some embodiments, the video frame 450 may comprise multiple fields of view captured by more than one of the capture devices 102a-102n and stitched together by the processors 106a-106n to generate a panoramic and/or spherical video frame. Generally, the apparatuses 100a-100n may perform computer vision operations on a series (e.g., temporally related) of video frames. Performing the computer vision operations on a series and/or sequence of video frames may enable the processors 106a-106n to make inferences about one or more of the objects. In one example, inferences may be determined about the movement of the vehicle 410a'. For example, by performing computer vision operations over a series of video frames, the speed of the vehicle 410a' may be determined. The processors 106a-106n may determine that the vehicle 410a' is decelerating as the intersection 402' is approached. In another example, the processors 106a-106n may infer that the vehicle 410b' is stopped at the intersection 402' if the vehicle 410b' has not moved for a number of video frames. The movement of the objects may be determined based on changes in relative positions of objects in the series of video frames and may account for the movement of the ego vehicle 50.

The computer vision analysis performed by the processors 106a-106n may be configured to detect characteristics of detected objects. The characteristics of the detected objects may be observations about an object and/or a status of an object that may be used to make an inference. In one example, the characteristics of the detected objects may be a speed and/or direction of movement. In the example video frame 450, a box 452 and a box 454 is shown. The box 452 may represent the processors 106a-106n detecting the characteristics of the driver of the vehicle 410a'. The box 454 may represent the processors 106a-106n detecting the characteristics of the vehicle 410b'.

In some embodiments, the CNN module 150 may be configured to detect faces in the video frame 450. In some embodiments, the processor 106a-106n may be configured to recognize faces through facial recognition (e.g., based on faces stored as references in the memory 108). For example, the face of the driver 452 may be one of the characteristics of the vehicle 410a' detected by the processors 106a-106n.

In some embodiments, the CNN module 150 may be configured to analyze a series of video frames to determine whether the driver 452 is performing a gesture. In an example, a gesture performed by the driver may be the characteristic 452 of the detected object 410a'. In an example, the CNN module 150 may detect the body orientation of the driver in a first position, then over a series of video frames determine that the body orientation is changing. The CNN module 150 may be configured to classify and/or recognize the change in body orientation as a gesture. The decision module 158 may be configured to infer a meaning from the recognized gesture. In an example, one of the recognized gestures may be the driver waving at the ego vehicle 50, and the meaning inferred from the recognized gesture may be to traverse the intersection 402' before the vehicle 410a' (e.g., regardless of the order of the vehicle sequence). The processors 106a-106n may be configured to make decisions based on the characteristics 452 of the object 410a'.

The CNN module 150 may be configured to provide the confidence level indicating the likelihood that the detected object (or the understanding of what has been detected, such as understanding that a wave indicates to go through an intersection) is correct. For example, a high confidence level for a detected object and/or detected gesture of a particular driver may indicate that the computer vision result is consistent with the particular type of object (e.g., a stopped vehicle) and/or type of gesture (e.g., waving a car through). A low confidence for a detected object and/or detected gesture of a particular driver may indicate that the computer vision result is inconsistent with the particular type of object (e.g., unable to determine whether the vehicle is stopped or just slowing down) and/or type of gesture (e.g., unable to determine whether the driver is waving hello or waving a car through first). Various checks may be performed to determine the confidence level. The decision module 158 may make decisions when the confidence level is above a pre-defined threshold. In some embodiments, information from the vehicle sensors 114 may be used to adjust the confidence level.

The CNN module 150 may be configured to determine the characteristics 454 of the vehicle 410b'. In the example shown, the characteristics 454 may be flashing headlights. For example, some drivers flash headlights to indicate that another vehicle can go first. The processors 106a-106n may perform the video analysis over a series of video frames to determine whether the vehicle headlights are flashing. The characteristics 454 (e.g., the flashing headlights) may be used by the decision module 158 to determine the vehicle sequence. For example, the flashing headlights 454 may indicate that the ego vehicle 50 should be moved ahead of the vehicle 410b' in the vehicle sequence.

The processors 106a-106n may perform the computer vision operations on the video frame 450 and a series of video frames (e.g., before and after the video frame 450) to determine the vehicle sequence. For example, the CNN module 150 may detect the intersection 402' based on the arrangement of the detected roads 404a'-404b' and 406a'-406b' to infer that the roads form the intersection 402'. In some embodiments, the sensor fusion module 152 may detect that the driver of the ego vehicle 50 is slowing down, which may provide additional data for deciding that the intersection 402' is present. The processors 106a-106n may detect the infrastructure 408a-408c and determine that the infrastructure 408a-408c are stop signs. The processors 106a-106n may detect the objects 410a'-410b' and determine that the objects 410a'-410b' are vehicles. The processors 106a-106n may detect the characteristics of the vehicles (e.g., rate of movement, deceleration, etc.) to determine that the vehicles 410a'-410b' are stopped and/or slowing down.

The processors 106a-106n may use the local rules stored in and/or interpreted by the driving policy module 154 to determine the vehicle sequence based on the detections made using the computer vision operations. For example, the processors 106a-106n may compare the detected objects 410a'-410b' to determine which vehicle stopped at the intersection 402' first. The vehicle that stopped first may be added to the vehicle sequence. In another example, the local rules may provide guidance if the vehicles 410a'-410b' stop at the same time. For example, the vehicle to the right may be added first if two vehicles stop at the same time. The sensor fusion module 152 may perform sensor fusion operations using the vehicle sensors 114 to determine when the ego vehicle 50 has stopped. The data from the vehicle sensors 114 and/or the data from the computer vision operations may be compared to determine when the ego vehicle 50 has stopped compared to the other vehicles 410a'-410b'. By analyzing all the factors, the decision module 158 may generate the vehicle sequence.

The decision module 158 may be further configured to adjust the vehicle sequence based on the computer vision operations. In one example, inferences made based on the characteristics 452-454 may provide a basis for adjusting the vehicle sequence. In one example, the characteristics 452-454 may be a gesture indicating another vehicle to go first (e.g., move one vehicle up in the vehicle sequence). In another example, the characteristics 452-454 may be an emergency vehicle approaching the intersection 402' (e.g., detecting flashing lights above a vehicle that may be driving fast may cause all the vehicles in the vehicle sequence to be moved down in the sequence and the emergency vehicle may be moved to the top of the sequence). In yet another example, detecting the flashing headlights 454 may indicate that the ego vehicle 50 may be moved up in the vehicle sequence. In still another example, if the characteristics 452-454 of the driver of one of the vehicles indicates that the driver is not paying attention (e.g., looking at a smartphone instead of the road) all of the other vehicles may be moved down the vehicle sequence in anticipation of the inattentive driver not stopping at all at the intersection 402'. The various characteristics 452-454 and/or the effect of the detected characteristics on the vehicle sequence may be varied according to the design criteria of a particular implementation.

In the example shown, the example video frame 450 shows a field of view capturing the area exterior to the front of the ego vehicle 50. Generally, for traversing the intersection 402', computer vision operations for the area exterior to the ego vehicle 50 may provide the relevant data. In some embodiments, one or more of the capture devices 102a-102n may be directed at the interior of the ego vehicle 50 (e.g., capturing the driver 202). For example, the characteristics of the driver 202 of the ego vehicle 50 may provide relevant data for the vehicle sequence (e.g., if the driver 202 is waving through another vehicle and/or the driver 202 is not paying attention to the road).

Figure 8:
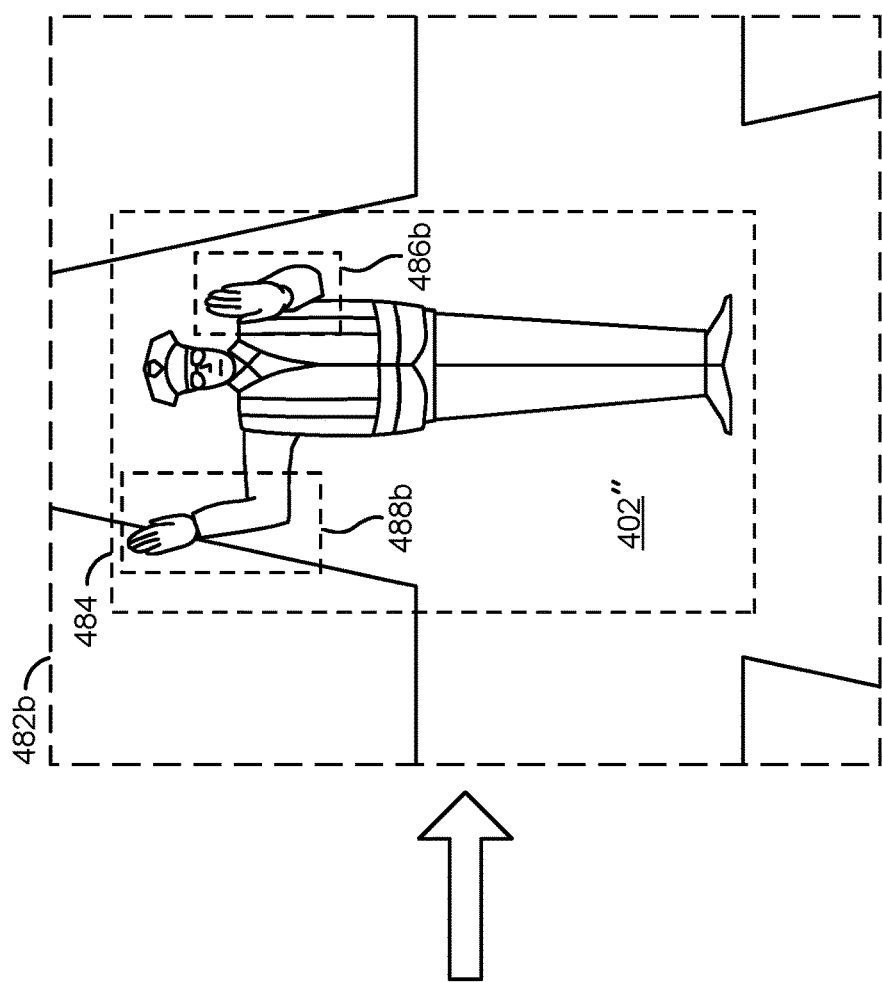
FIG. 8 is a diagram illustrating detecting a gesture.
Figure 8:
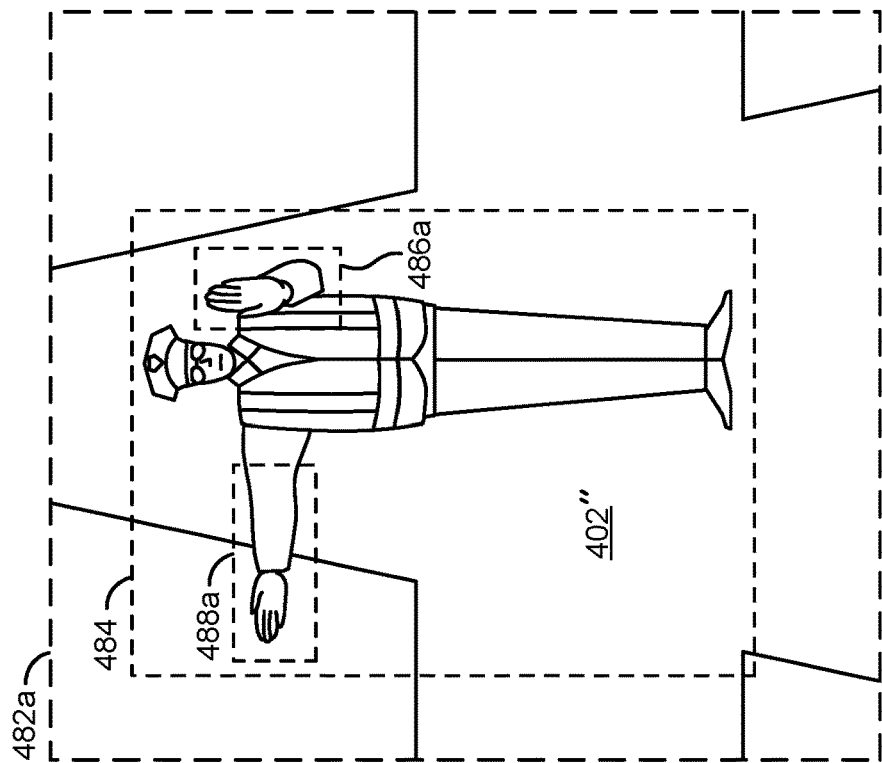

Referring to FIG. 8, a diagram illustrating detecting a gesture is shown. A sequence of video frames 480 is shown. The sequence of video frames 480 may comprise a video frame 482a and a video frame 482b. In one example, the sequence of video frames 480 may be representative of consecutive video frames (e.g., the video frame 482b is the frame captured immediately after the video frame 482a). In another example, the sequence of video frames 480 may represent video frames that are temporally related (e.g., the video frame 482b is a video frame captured at some time after the video frame 482a). The relationship of the video frames 482a-482b may be varied according to the design criteria of a particular implementation.

The video frames 482a-482b may each be one of the video frames captured by one of the capture devices 102a-102n and/or analyzed by the processors 106a-106n. In the example shown, the video frames 482a-482b may each comprise a view of the intersection 402". In each of the video frames 482a-482b a box 484 is shown. The box 484 may represent an object detected by the CNN module 150. In the example shown, the box 484 in each of the video frames 482a-482b may be an officer directing traffic. In some embodiments, the decision module 158 may determine that an officer directing traffic may override rules, regulations and/or local customs when navigating the intersection 402".

The CNN module 150 may be configured to detect characteristics of the detected object 484. In the example shown, the characteristics may be a gesture. A gesture may be detected by tracking the movements of the detected object 484 over the sequence of video frames 480. In the example video frame 482a, a box 486a and a box 488a are shown. The box 486a and the box 488a may each be an example characteristic of the object 484 detected by the CNN module 150. In the example shown, the characteristic 486a may be a hand position of a left hand of the traffic officer 484. In the example shown, the characteristic 488a may be a hand position of a right hand of the traffic officer 484. In the example video frame 482b, a box 486b and a box 488b are shown. The box 486b and the box 488b may each be an example characteristic of the object 484 detected by the CNN module 150. In the example shown, the characteristic 486b may be a hand position of a left hand of the traffic officer 484. In the example shown, the characteristic 48b may be a hand position of a right hand of the traffic officer 484. When analyzed over the related video frames 482a-482b, the characteristics 486a-486b and/or the characteristics 488a-488b may be determined to be gestures. For example, the position of the left hand 486a in the earlier video frame 482a may be compared to the position of the left hand 486b in the later video frame 482b to determine the gesture 486a-486b. Similarly, the position of the right hand 488a in the earlier video frame 482a may be compared to the position of the right hand 488n in the later video frame 482b to determine the gesture 488a-488b. Furthermore, the arrangement of the fingers and/or orientation of the hand and/or arm may be compared between the earlier video frame 482a and the later video frame 482b. In the example shown, the gesture 486a-486b and the gesture 488a-488b may correspond to the hands and/or arms of the detected object 484. However, gestures may be detected for other body parts (e.g., head movements, leg movements, pelvic movements, foot movements, etc.). Similarly, while only one detected object 484 is shown, gestures may be detected for each object detected in the sequence of video frames 480. The types of gestures detected may be varied according to the design criteria of a particular implementation.

In the example shown, the gesture 486a-486b may be a hand positioned flat and upright and facing the capture device 102a that captured the video frames 482a-482b (e.g., facing the ego vehicle 50). The position of the hand 486a may be the same as the position of the hand 486b (e.g., the gesture may comprise no movement between the video frames 482a-482b). The gesture 486a-486b may be a stop gesture. The decision module 158 may determine that the traffic officer 484 is gesturing that the ego vehicle 50 should stop at the intersection 402" regardless of the vehicle sequence and/or other indications (e.g., stop signs, yield signs, traffic lights, etc.).

In the example shown, the gesture 488a-488b may be a movement of a hand from one position to a next position. In the earlier video frame 482a, the position of the hand 488a may be an arm outstretched to the side of the traffic officer 484. In the later video frame 482b, the position of the hand 488b may be an arm out to the side of the traffic officer 484 with the arm bent upwards. Together, the gesture 488a-488b may be a waving and/or beckoning motion. For example, CNN module 150 may detect the gesture 488a-488b and the decision module 158 may determine that the traffic officer 484 is waving a vehicle to the left of the intersection 402" through.

The processors 106a-106n may be configured to analyze the gesture 486a-486b and the gesture 488a-488b together for context in order to make inferences. In an example, analyzing the video frame 482a, the gesture 486a-486b may indicate that the ego vehicle 50 may not drive straight through the intersection 402". However, if only analyzing one video frame (e.g., the video frame 482a), the position of the hand 488a may be misinterpreted as indicating that the ego vehicle 50 may pass through the intersection 402" by turning left. By analyzing the sequence of video frames 480, the gesture 488a-488b may be detected and the decision module 158 may determine that the traffic officer 484 is indicating that the ego vehicle 50 may not pass through the intersection 402" in any direction, and instead infer that the traffic officer 484 is indicating that traffic from the left of the intersection 402" may pass. For example, the inferences made by analyzing the sequence of video frames 480 (e.g., both the video frames 482a-482b) may be different than inferences made by analyzing either one of the video frame 482a or the video frame 482b alone.

The characteristics (e.g., the gestures 486a-486b and/or the gestures 488a-488b) may be interpreted by the decision module 158 in order to update the vehicle sequence. In some embodiments, the gestures 486a-486b and/or the gestures 488a-488b may be used to change an order of the vehicle sequence. In one example, one of the gestures 486a-486b and/or the gestures 488a-488b may comprise a driver of another vehicle waving the ego vehicle 50 through the intersection 402". For example, the CNN module 150 may detect the movements and/or body position of the driver inside one of the vehicles 410a-410d to determine whether one of the drivers is performing the gestures 486a-486b and/or 488a-488b.

Figure 9:
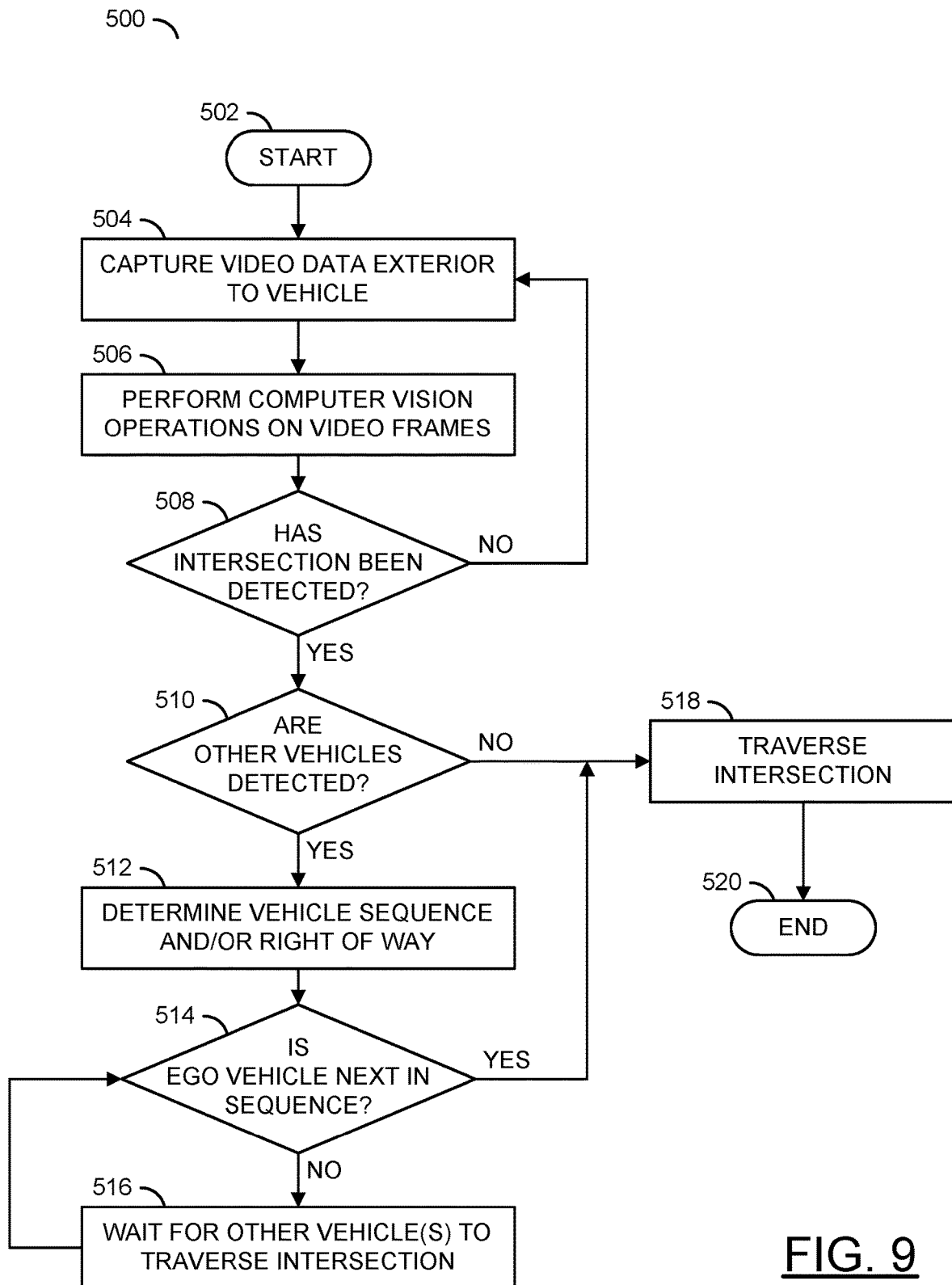
FIG. 9 is a flow diagram illustrating a method for handling intersection navigation without traffic lights using computer vision.

Referring to FIG. 9, a method (or process) 500 is shown. The method 500 may handle intersection navigation without traffic lights using computer vision. The method 500 generally comprises a step (or state) 502, a step (or state) 504, a step (or state) 506, a decision step (or state) 508, a decision step (or state) 510, a step (or state) 512, a decision step (or state) 514, a step (or state) 516, a step (or state) 518, and a step (or state) 520.

The step 502 may start the method 500. In the step 504, the capture devices 102a-102n may capture video data exterior to the ego vehicle 50. Next, in the step 506, the processors 106a-106n (e.g., the CNN module 150) may perform the computer vision operations on the captured video frames. Next, the method 500 may move to the decision step 508.

In the decision step 508, the decision module 158 may determine whether an intersection (e.g., the intersection 402) has been detected (e.g., based on inferences made about the arrangement of the detected roads). If an intersection has not been detected, the method 500 may return to the step 504. If an intersection has been detected, the method 500 may move to the decision step 510.

In the decision step 510, the processors 106a-106n may determine whether other vehicles 410a-410d are detected at the intersection 402. If other vehicles are not detected, the method 500 may move to the step 518. If other vehicles are detected, the method 500 may move to the step 512. In the step 512, the decision module 158 may determine the vehicle sequence and/or right of way. For example, the vehicle sequence may be determined based on the local rules in the driving policy module 154 and/or the computer vision operations performed by the CNN module 150. Next, the method 500 may move to the decision step 514.

In the decision step 514, the decision module 158 may determine whether the ego vehicle 50 is next in the vehicle sequence. If the ego vehicle 50 is not next in the vehicle sequence, the method 500 may move to the step 516. In the step 516, the processors 106a-106n may wait for other vehicle(s) to traverse the intersection 402. For example, the computer vision operations may detect whether one or more other vehicles have traveled through the intersection and the vehicle sequence may be updated. Next, the method 500 may return to the decision step 514. In the decision step 514, if the ego vehicle 50 is next in the vehicle sequence, the method 500 may move to the step 518.

In the step 518, the ego vehicle 50 may traverse the intersection 402. For example, the processors 106a-106n may generate the signal VCTRL to enable the actuators 116 to autonomously drive the ego vehicle 50 through the intersection 402. In another example, the processors 106a-106n may present the signal VOUT to the display 118, which may display a prompt (e.g., message) to tell the driver 202 to travel through the intersection 402. Next, the method 500 may move to the step 520. The step 520 may end the method 500.

Figure 10:
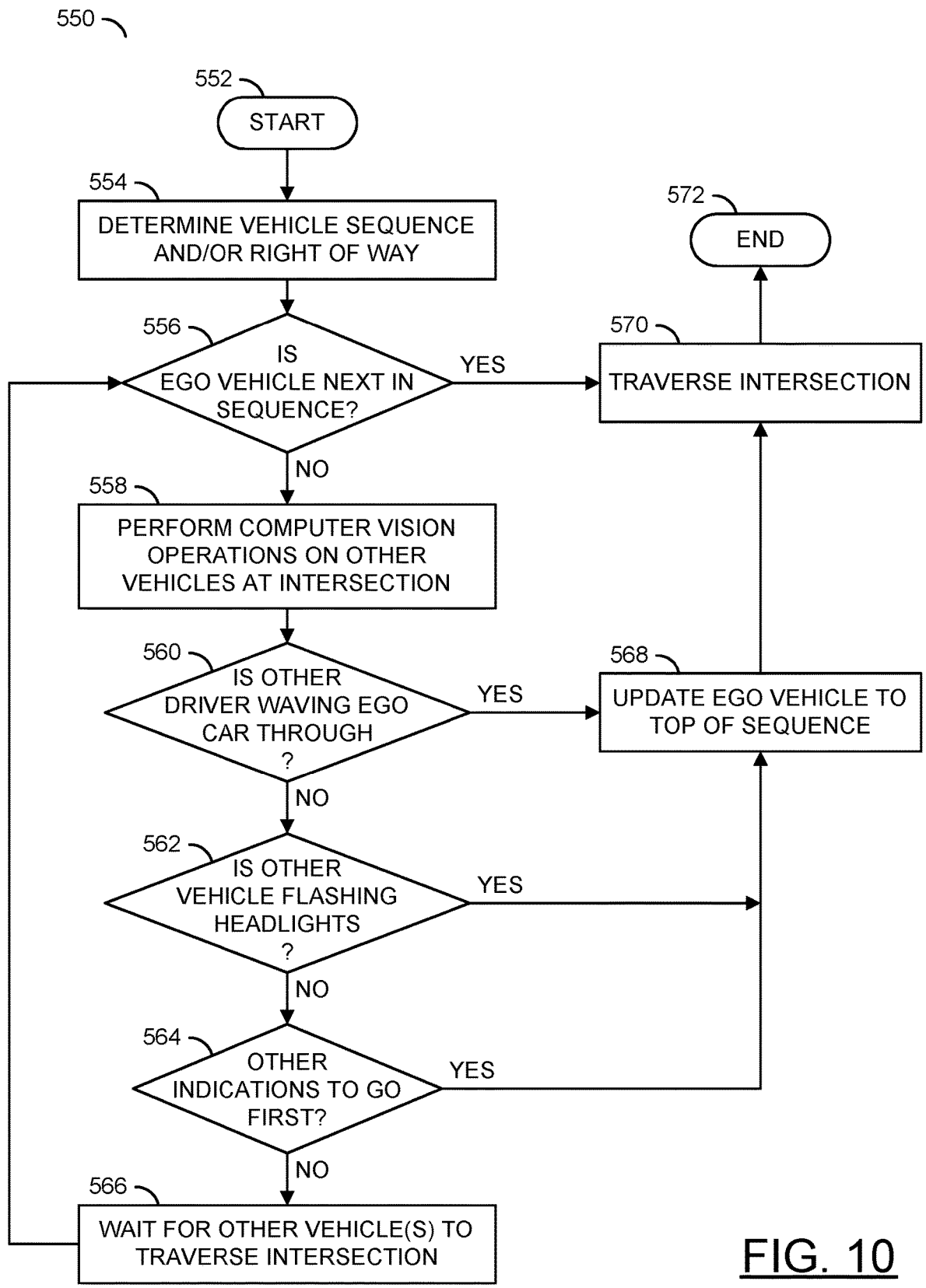
FIG. 10 is a flow diagram illustrating a method for promoting a vehicle in a sequence.

Referring to FIG. 10, a method (or process) 550 is shown. The method 550 may promote a vehicle in a sequence. The method 550 generally comprises a step (or state) 552, a step (or state) 554, a decision step (or state) 556, a step (or state) 558, a decision step (or state) 560, a decision step (or state) 562, a decision step (or state) 564, a step (or state) 566, a step (or state) 568, a step (or state) 570, and a step (or state) 572.

The step 552 may start the method 550. In the step 552, the decision module 158 may determine the vehicle sequence and/or the right of way. Next, the method 550 may move to the decision step 556.

In the decision step 556, the decision module 158 may determine whether the ego vehicle 50 is next in the vehicle sequence. If the ego vehicle 50 is next in the vehicle sequence, the method 550 may move to the step 570. If the ego vehicle 50 is not next in the vehicle sequence, the method 550 may move to the step 558. In the step 558, the processors 106a-106n may perform the computer vision operations on the other vehicles 410a-410d at the intersection 402. For example, the CNN module 150 may detect the objects and/or the characteristics 452-454 associated with the objects, which may result in adjustments to the vehicle sequence. Next, the method 550 may move to the decision step 560.

In the decision step 560, the decision module 158 may determine whether the characteristics 452 indicate that a driver is waving through the ego car 50. If another driver is waving through the ego vehicle 50, the method 550 may move to the step 568. If another driver is not waving through the ego vehicle 50, the method 550 may move to the decision step 562.

In the decision step 562, the decision module 158 may determine whether the characteristics 454 indicate that another vehicle is flashing the headlights. If another vehicle is flashing the headlights, the method 550 may move to the step 568. If another vehicle is not flashing the headlights, the method 550 may move to the decision step 564.

In the decision step 564, the decision module 158 may determine whether there are other indications that the ego vehicle 50 should go first (e.g., a police officer directing traffic, road signage, etc.). If there is no other indication for the ego vehicle 50 to go first, then the method 550 may move to the step 566. In the step 566, the processors 106a-106n may wait for other vehicle(s) to traverse the intersection 402. For example, the computer vision operations may detect whether one or more other vehicles have traveled through the intersection and the vehicle sequence may be updated. Next, the method 550 may return to the decision step 556.

In the decision step 564, if there are other indications that the ego vehicle 50 should go first, then the method 550 may move to the step 568. In the step 568, the decision module 158 may update the ego vehicle 50 to the top of the vehicle sequence (e.g., promote the ego vehicle 50). In some embodiments, the communication devices 110 may perform the V2X communication to provide the updated vehicle sequence to other of the apparatuses 100a-100n. Next, in the step 570, the ego vehicle 50 may traverse the intersection. Next, the method 550 may move to the step 572. The step 572 may end the method 550.

Figure 11:
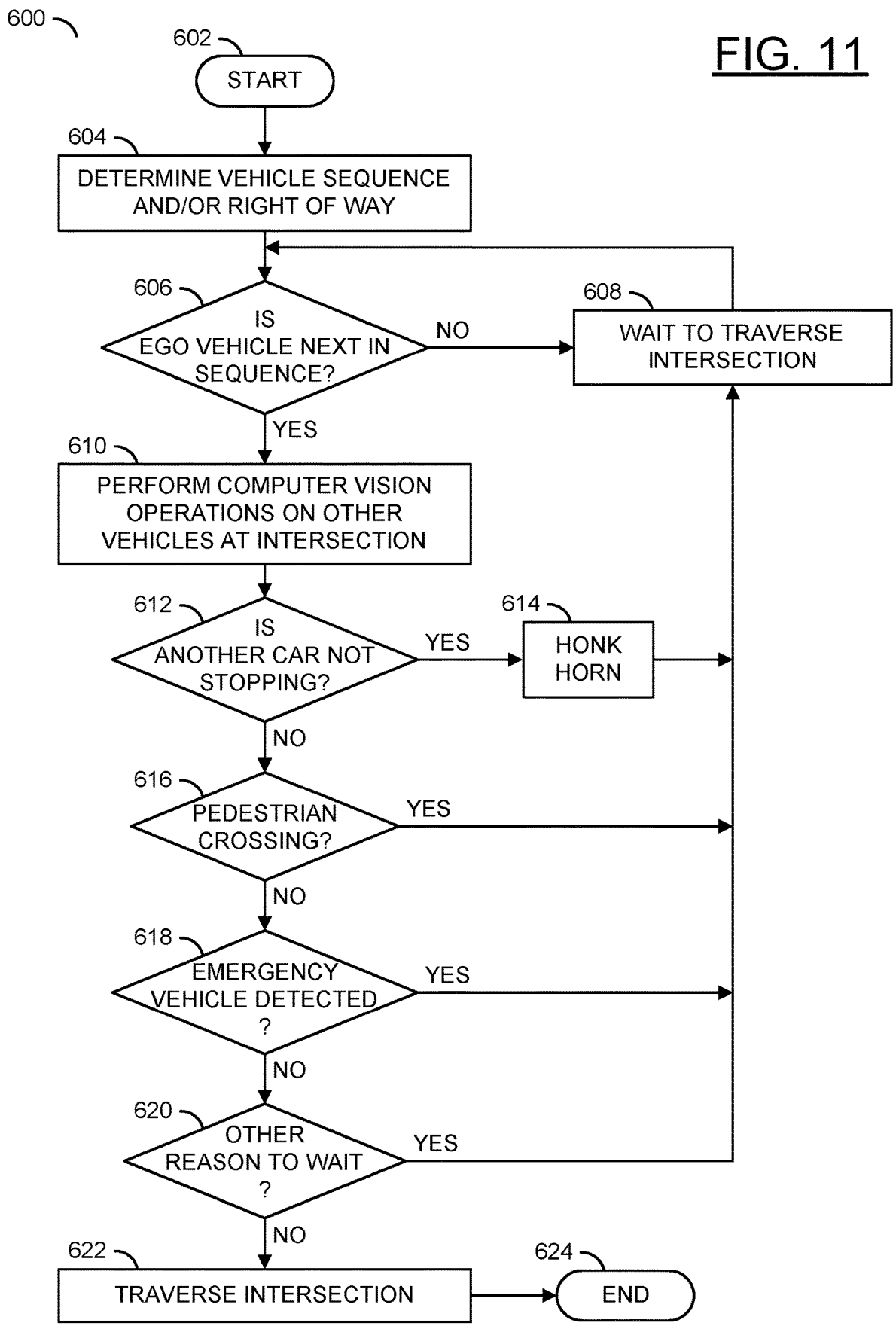
FIG. 11 is a flow diagram illustrating a method for demoting a vehicle in a sequence.

Referring to FIG. 11, a method (or process) 600 is shown. The method 600 may demote a vehicle in a sequence. The method 600 generally comprises a step (or state) 602, a step (or state) 604, a decision step (or state) 606, a step (or state) 608, a step (or state) 610, a decision step (or state) 612, a step (or state) 614, a decision step (or state) 616, a decision step (or state) 618, a decision step (or state) 620, a step (or state) 622, and a step (or state) 624.

The step 602 may start the method 600. In the step 604, the decision module 158 may determine the vehicle sequence and/or the right of way. Next, the method 600 may move to the decision step 606.

In the decision step 606, the decision module 158 may determine whether the ego vehicle 50 is next in the vehicle sequence. If the ego vehicle 50 is not next in the vehicle sequence, the method 600 may move to the step 608. In the step 608, the ego vehicle 50 may wait to traverse the intersection. In an example, the processors 106a-106n may present the signal VCTRL to the actuators 116 to prevent the ego vehicle 50 from traveling. In another example, the processors 106a-106n may present the signal VOUT to the display 118 to provide a prompt (e.g., message) to the driver 202 to wait. Waiting to traverse the intersection may be a demotion in the vehicle sequence. Next, the method 600 may return to the decision step 606.

In the decision step 606, if the ego vehicle 50 is next in the vehicle sequence, the method 600 may move to the step 610. In the step 610, the processors 106a-106n may perform the computer vision operations on the other vehicles 410a-410d at the intersection 402. For example, the CNN module 150 may detect the objects and/or the characteristics 452-454 associated with the objects, which may result in adjustments to the vehicle sequence. Next, the method 600 may move to the decision step 612.

In the decision step 612, the decision module 158 may determine whether another vehicle is not stopping. If another vehicle is not stopping, the method 600 may move to the step 614. In the step 614, the processors 106a-106n may generate the signal VCTRL to cause one of the actuators 116 to honk the horn. Next, the method 600 may move to the step 608. In the decision step 612, if there is no other vehicle not stopping, the method 600 may move to the decision step 616.

In the decision step 616, the decision module 158 may determine whether there is a pedestrian crossing the intersection 402. If there is a pedestrian crossing the intersection 402, the method 600 may move to the step 608 (e.g., demote the ego vehicle 50 in the vehicle sequence). If there is not a pedestrian crossing the intersection 402, the method 600 may move to the decision step 618.

In the decision step 618, the decision module 158 may determine whether an emergency vehicle has been detected (e.g., an ambulance, a police cruiser, a fire truck, etc.). If an emergency vehicle has been detected, the method 600 may move to the step 608 (e.g., demote the ego vehicle 50 in the vehicle sequence). If an emergency vehicle has not been detected, the method 600 may move to the decision step 620.

In the decision step 620, the decision module 158 may determine whether there is another reason to wait (e.g., a police officer directing traffic, road signage, etc.). If there is another reason to wait, the method 600 may move to the step 608 (e.g., demote the ego vehicle 50 in the vehicle sequence). If there is not another reason to wait, the method 600 may move to the step 622. In the step 622, the ego vehicle 50 may traverse the intersection. Next, the method 600 may move to the step 624. The step 624 may end the method 600.

Figure 12:
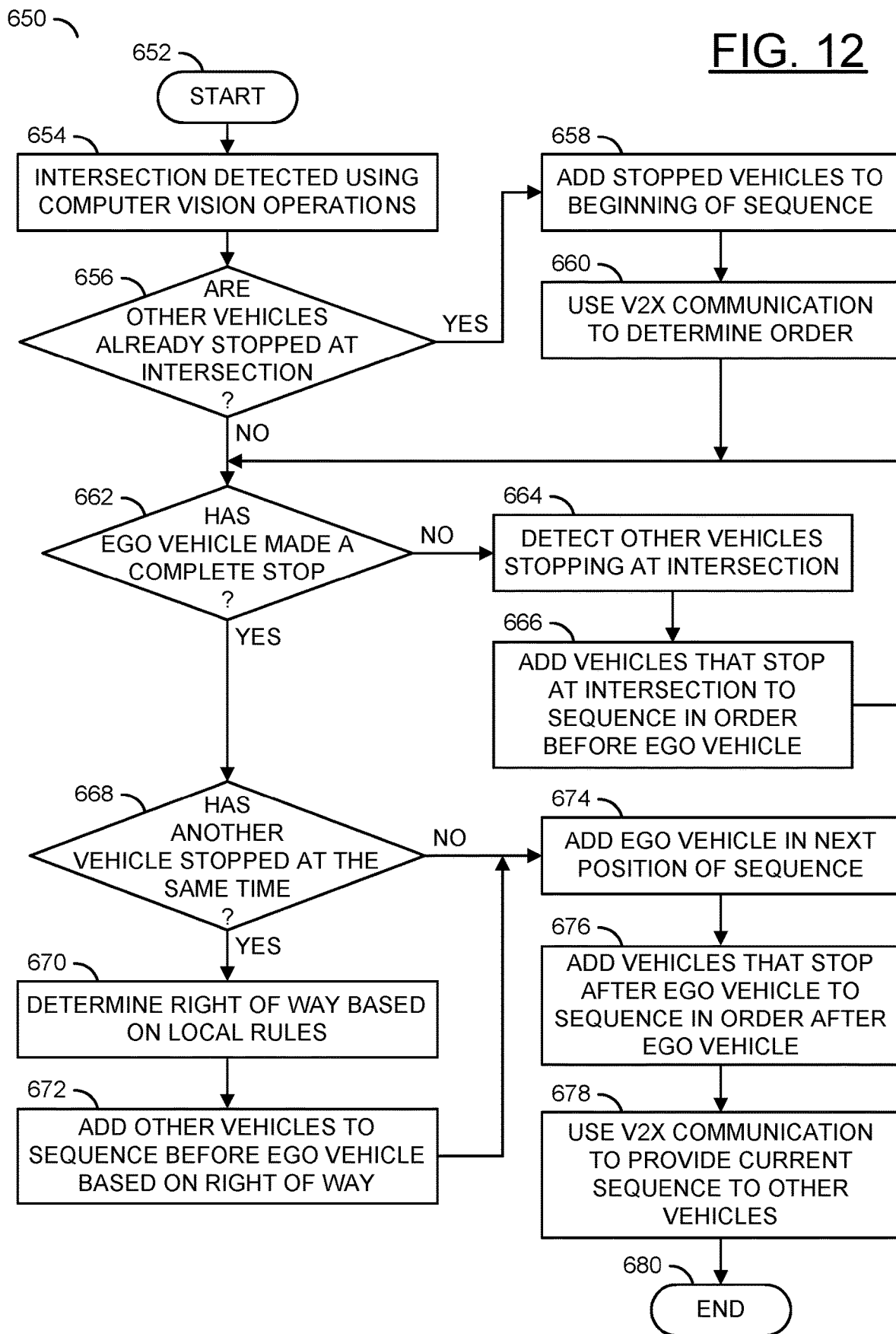
FIG. 12 is a flow diagram illustrating a method for determining a vehicle order for a sequence.

Referring to FIG. 12, a method (or process) 650 is shown. The method 650 may determine a vehicle order for a sequence. The method 650 generally comprises a step (or state) 652, a step (or state) 654, a decision step (or state) 656, a step (or state) 658, a step (or state) 660, a decision step (or state) 662, a step (or state) 664, a step (or state) 666, a decision step (or state) 668, a step (or state) 670, a step (or state) 672, a step (or state) 674, a step (or state) 676, a step (or state) 678, and a step (or state) 680.

The step 652 may start the method 650. In the step 654, the CNN module 150 may detect the intersection 402 using the computer vision operations. Next, the method 650 may move to the decision step 656.

In the decision step 656, the processors 106a-106n may determine whether other vehicles are already stopped at the intersection (e.g., before the ego vehicle 50). If other vehicles are already stopped at the intersection 402, the method 650 may move to the step 658. In the step 658, the decision module 158 may add the stopped vehicles to the beginning of the vehicle sequence. Next, in the step 660, the communication devices 110 may use V2X communication to determine the order (e.g., received from the apparatuses 100a-100n already present at the intersection 402). Next, the method 650 may move to the decision step 662. In the decision step 656, if there are not other vehicles already stopped at the intersection 502, the method 650 may move to the decision step 662.

In the decision step 662, the decision module 158 may determine whether the ego vehicle 50 has made a complete stop at the intersection 402. For example, the computer vision operations and/or the sensor fusion module 152 may determine whether the ego vehicle 50 has stopped moving and has reached the intersection 402 (e.g., based on detecting a speed of the ego vehicle 50 and/or the size of the intersection 402 increasing in the video frame 450). If the ego vehicle 50 has not made a complete stop at the intersection 402, the method 650 may move to the step 664. In the step 664, the processors 106a-106n may detect other vehicles stopping at the intersection 402 before the ego vehicle 50. Next, in the step 666, the decision module 158 may add the other vehicles that stop at the intersection 402 before the ego vehicle 50 to the vehicle sequence in order. Next, the method 650 may return to the decision step 662. In the decision step 662, if the ego vehicle 50 has made a complete stop at the intersection 402, then the method 650 may move to the decision step 668.

In the decision step 668, the processors 106a-106n may determine whether another vehicle has stopped at the intersection 402 at the same time as the ego vehicle 50. If another vehicle has stopped at the same time, the method 650 may move to the step 670. In the step 670, the driver policy module 154 may determine the local rules based on the right of way. For example, local rules may indicate that when two vehicles stop at the same time, the vehicle to the right may have the right of way. In another example, local rules may indicate that when two vehicles across from each other stop at the same time and both are not turning, both vehicles may traverse the intersection at the same time. In yet another example, local rules may indicate that when two vehicles across from each other stop at the same time and one is turning, then the vehicle traveling straight may have the right of way. Next, in the step 672, the decision module 158 may add other vehicles to the vehicle sequence before the ego vehicle 50 based on the determined right of way rules. Next, the method 650 may move to the step 674.

In the decision step 668, if another vehicle has not stopped at the intersection 402 at the same time as the ego vehicle 50, then the method 650 may move to the step 674. In the step 674, the decision module 158 may add the ego vehicle 50 to the vehicle sequence in the next open position of the vehicle sequence. Next, in the step 676, the decision module 158 may add vehicles that stop at the intersection 402 after the ego vehicle 50 to the vehicle sequence in order after the position of the ego vehicle 50. In the step 678, the communication devices 110 may use V2X communication to provide the current vehicle sequence to the other vehicles. Next, the method 650 may move to the step 680. The step 680 may end the method 650.

Generally, to determine the vehicle sequence for the intersection 402, the processors 106a-106n may detect the order that the vehicles come to a complete stop. In some embodiments, a full stop (compared to a rolling "stop") may be used to determine the proper order. The vehicle sequence may be adjusted in response to vehicles that do not stop or come to improper (e.g., rolling) stops. For example, a vehicle may be penalized by being demoted on the vehicle sequence for an improper stop (or not indicating). Local rules may be used to find a solution to indeterminate situations such as when two cars arrive at the same time. Generally, vehicles to the right go first, but local rules and/or customs may change based on location. Characteristics of the detected objects may be used to adjust the vehicle sequence. For example, one characteristic of waving another car through may change the vehicle sequence. Similarly, audio may be used to detect if a vehicle has honked to indicate another vehicle should go first. V2X communication may be implemented to communicate the vehicle sequence to the vehicles at the intersection.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a capture device configured to generate a plurality of video frames corresponding to an area outside of a vehicle; and
    a processor configured to (i) perform operations to detect objects in said video frames, (ii) detect (a) an intersection and (b) other vehicles at said intersection based on said objects detected in said video frames, (iii) determine a vehicle sequence for traversing said intersection and (iv) monitor said other vehicles traversing said intersection using said operations, wherein
        (A) said vehicle sequence is determined in response to local rules and used to determine when said vehicle traverses said intersection,
        (B) said processor is further configured to (i) determine characteristics of said objects detected in said video frames and (ii) adjust said vehicle sequence in response to said characteristics,
        (C) said characteristics comprise at least one of (a) flashing headlights of one of said other vehicles and (b) a person waving said vehicle through said intersection, and
        (D) said vehicle sequence is adjusted by moving said vehicle to a beginning of said vehicle sequence.

2. The apparatus according to claim 1, wherein said intersection does not have traffic lights and said apparatus handles navigation of said intersection.

3. The apparatus according to claim 2, wherein said processor is configured to navigate said intersection autonomously.

4. The apparatus according to claim 1, wherein said vehicle sequence comprises a dynamic ordered list of said vehicle and said other vehicles at said intersection.

5. The apparatus according to claim 4, wherein said dynamic ordered list is modified as said vehicle and said other vehicles arrive at or leave said intersection.

6. The apparatus according to claim 4, wherein said apparatus is further configured to communicate an updated version of said dynamic ordered list by implementing at least one of (a) vehicle-to-vehicle communication or (b) vehicle-to-infrastructure communication.

7. The apparatus according to claim 1, wherein said vehicle sequence is used to determine a right of way between said vehicle and said other vehicles for navigating said intersection.

8. The apparatus according to claim 1, wherein (i) said characteristics comprise gestures performed by a person and (ii) said gestures are detected by analyzing a movement of said person in a sequence of video frames.

9. The apparatus according to claim 1, wherein (i) said characteristics comprise at least one of (a) one of said other vehicles not stopping, (b) a pedestrian crossing or (c) detecting an emergency vehicle and (ii) said vehicle sequence is adjusted by moving said vehicle down said vehicle sequence.

10. The apparatus according to claim 1, wherein said operations comprise computer vision operations.

11. The apparatus according to claim 10, wherein said computer vision is implemented by a convolutional neural network.

12. The apparatus according to claim 11, wherein said convolutional neural network is trained using fleet learning.

13. The apparatus according to claim 12, wherein (i) said fleet learning comprises capturing reference images using capture devices implemented in a plurality of vehicles, (ii) said reference images comprise areas exterior to said plurality of vehicles, (iii) said reference images are used as training data for said convolutional neural network and (iv) said training data comprises said reference images from many different vehicles.

14. The apparatus according to claim 1, wherein said processor has a plurality of co-processors.

15. The apparatus according to claim 1, wherein (i) said apparatus comprises a second capture device configured to implement a stereo camera pair with said capture device and (ii) said operations comprise performing stereo vision to determine depth information based on said video frames captured by said stereo camera pair.

16. The apparatus according to claim 1, wherein (i) said operations are configured to determine when said other vehicles stop at said intersection, (ii) said other vehicles that stop at said intersection after said vehicle are added to said vehicle sequence before said vehicle and (iii) said other vehicles that stop at said intersection after said vehicle are added to said vehicle sequence after said vehicle.

17. The apparatus according to claim 1, wherein said processor is configured to determine when said vehicle stops at said intersection using sensor fusion operations and (ii) said sensor fusion operations are used to make inferences based on (i) sensors of said vehicle and (ii) said operations performed on said video frames.

18. An apparatus comprising:
a capture device configured to generate a plurality of video frames corresponding to an area outside of a vehicle; and
a processor configured to (i) perform operations to detect objects in said video frames, (ii) detect (a) an intersection and (b) other vehicles at said intersection based on said objects detected in said video frames, (iii) determine a vehicle sequence for traversing said intersection and (iv) monitor said other vehicles traversing said intersection using said operations, wherein
  (A) said vehicle sequence is used to determine when said vehicle traverses said intersection,
  (B) said processor is further configured to (i) determine characteristics of said objects detected in said video frames and (ii) adjust said vehicle sequence in response to said characteristics,
  (C) said characteristics comprise at least one of (a) flashing headlights of one of said other vehicles and (b) a person waving said vehicle through said intersection, and
  (D) said vehicle sequence is adjusted by moving said vehicle to a beginning of said vehicle sequence.

* * * * *